(12) United States Patent
Chino et al.

(10) Patent No.: US 7,873,508 B2
(45) Date of Patent: Jan. 18, 2011

(54) APPARATUS, METHOD, AND COMPUTER PROGRAM PRODUCT FOR SUPPORTING COMMUNICATION THROUGH TRANSLATION BETWEEN LANGUAGES

(75) Inventors: Tetsuro Chino, Kanagawa (JP); Satoshi Kamatani, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1352 days.

(21) Appl. No.: 11/368,406

(22) Filed: Mar. 7, 2006

(65) Prior Publication Data

US 2006/0271350 A1 Nov. 30, 2006

(30) Foreign Application Priority Data

May 25, 2005 (JP) ............................. 2005-152989

(51) Int. Cl.
*G06F 17/28* (2006.01)
(52) U.S. Cl. .............................................. 704/2; 704/7
(58) Field of Classification Search ....................... None
See application file for complete search history.

(56) References Cited

U.S. PATENT DOCUMENTS

| | | | |
|---|---|---|---|
| 5,774,859 A * | 6/1998 | Houser et al. ................ | 704/275 |
| 2002/0032561 A1 * | 3/2002 | Ishikawa et al. ................ | 704/3 |
| 2004/0024601 A1 * | 2/2004 | Gopinath et al. ............ | 704/270 |
| 2004/0243392 A1 | 12/2004 | Chino et al. | |
| 2005/0197827 A1 * | 9/2005 | Ross et al. ...................... | 704/2 |

FOREIGN PATENT DOCUMENTS

| | | |
|---|---|---|
| JP | 4-319769 | 11/1992 |
| JP | 4-343173 | 11/1992 |
| JP | 07-334506 | 12/1995 |
| JP | 8-263258 | 10/1996 |
| JP | 10-177577 | 6/1998 |
| JP | 2001-83990 | 3/2001 |
| JP | 2001-217935 | 8/2001 |
| JP | 2002-41844 | 2/2002 |
| JP | 2002-82947 | 3/2002 |

(Continued)

OTHER PUBLICATIONS

Decision of a Patent Grant issued by the Japanese Patent Office on Dec. 8, 2009, for Japanese Patent Application No. 2005-152989, and English-language translation thereof.

(Continued)

*Primary Examiner*—David R Hudspeth
*Assistant Examiner*—Samuel G Neway
(74) *Attorney, Agent, or Firm*—Finnegan, Henderson, Farabow, Garrett & Dunner, L.L.P.

(57) ABSTRACT

A communication support apparatus includes a speech recognizer that recognizes a first speech of a source language as a first source language sentence, and recognizes a second speech of the source language following the first speech as a second source language sentence; a determining unit that determines whether the second language sentence is similar to the first language sentence; and a language converter that translates the first source language sentence into a first translation sentence, and translates the second source language sentence into a second translation sentence different from the first translation sentence when the determining unit determines that the second language sentence is similar to the first language sentence.

16 Claims, 26 Drawing Sheets

FOREIGN PATENT DOCUMENTS

| | | |
|---|---|---|
| JP | 2003-99080 | 4/2003 |
| JP | 2003-122750 | 4/2003 |
| JP | 2004-118720 | 4/2004 |
| JP | 2004-206185 | 7/2004 |

OTHER PUBLICATIONS

Tanaka, H., "Natural Language Processing and Its Applications," Chapter 1, Section 1.2.4, Fig. 1.14 Parse Trees based on a Context Free Grammar, 3 Sheets, (May 1999).

* cited by examiner

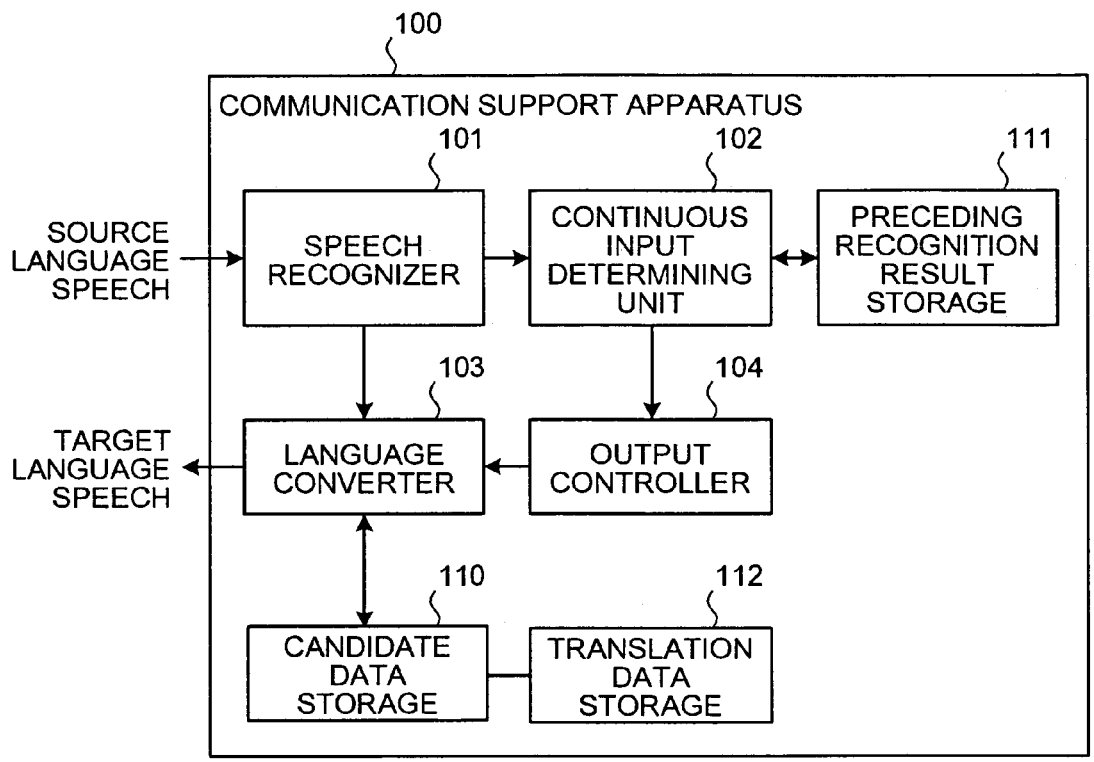

FIG.3

| SOURCE LANGUAGE SENTENCE | NUMBER OF CANDIDATES | TRANSLATION CANDIDATE LIST |
|---|---|---|
| お子様はいらっしゃいますか<br>(OKOSAMA WA IRASSHAI MASUKA) | 2 | 1 = "Will your child come here?",<br>2 = "Do you have any children?" |

| TIME POINT | EVENT |
|---|---|
| t0 | SPEECH INPUT = "おこさまはいらっしゃいますか (OKOSAMA WA IRASSHAI MASUKA)" |
| t1 | RECOGNITION RESULT = "お子様はいらっしゃいますか (OKOSAMA WA IRASSHAI MASUKA)" |
| t2 | PRECEDING RECOGNITION RESULT = VACANT |
| t3 | EXECUTE TRANSLATION<br>TRANSLATION CANDIDATE SENTENCE 1 = WILL YOUR CHILD COME HERE?<br>TRANSLATION CANDIDATE SENTENCE 2 = DO YOU HAVE ANY CHILDREN?<br>TOTAL NUMBER OF CANDIDATES? = 2 |
| t4 | CANDIDATE INDEX = 1<br>TRANSLATION CANDIDATE SENTENCE 1 = WILL YOUR CHILD COME HERE?<br>PRECEDING RECOGNITION RESULT = "お子様はいらっしゃいますか (OKOSAMA WA IRASSHAI MASUKA)" |
| t5 | OUTPUT "WILL YOUR CHILD COME HERE?" |
| t6 | TRANSLATION FAILURE |
| t7 | INPUT SPEECH AGAIN = "おこさまはいらっしゃいますか (OKOSAMA WA IRASSHAI MASUKA)" |
| t8 | RECOGNITION RESULT = "お子様はいらっしゃいますか (OKOSAMA WA IRASSHAI MASUKA)" |
| t9 | PRECEDING RECOGNITION RESULT AND RECOGNITION RESULT SIMILAR TO EACH OTHER<br>INCREMENT NUMBER OF TIMES CONTINUOUSLY INPUT TO 2 |
| t10 | NUMBER OF TIMES CONTINUOUSLY INPUT = THRESHOLD OF NUMBER OF TIMES CONTINUOUSLY INPUT (=2) |
| t11 | INCREMENT CANDIDATE INDEX TO 2 |
| t12 | SELECT SECOND TRANSLATION CANDIDATE SENTENCE FROM TRANSLATION CANDIDATE LIST<br>OUTPUT "DO YOU HAVE ANY CHILDREN?" |
| t13 | TRANSLATION SUCCEEDS |

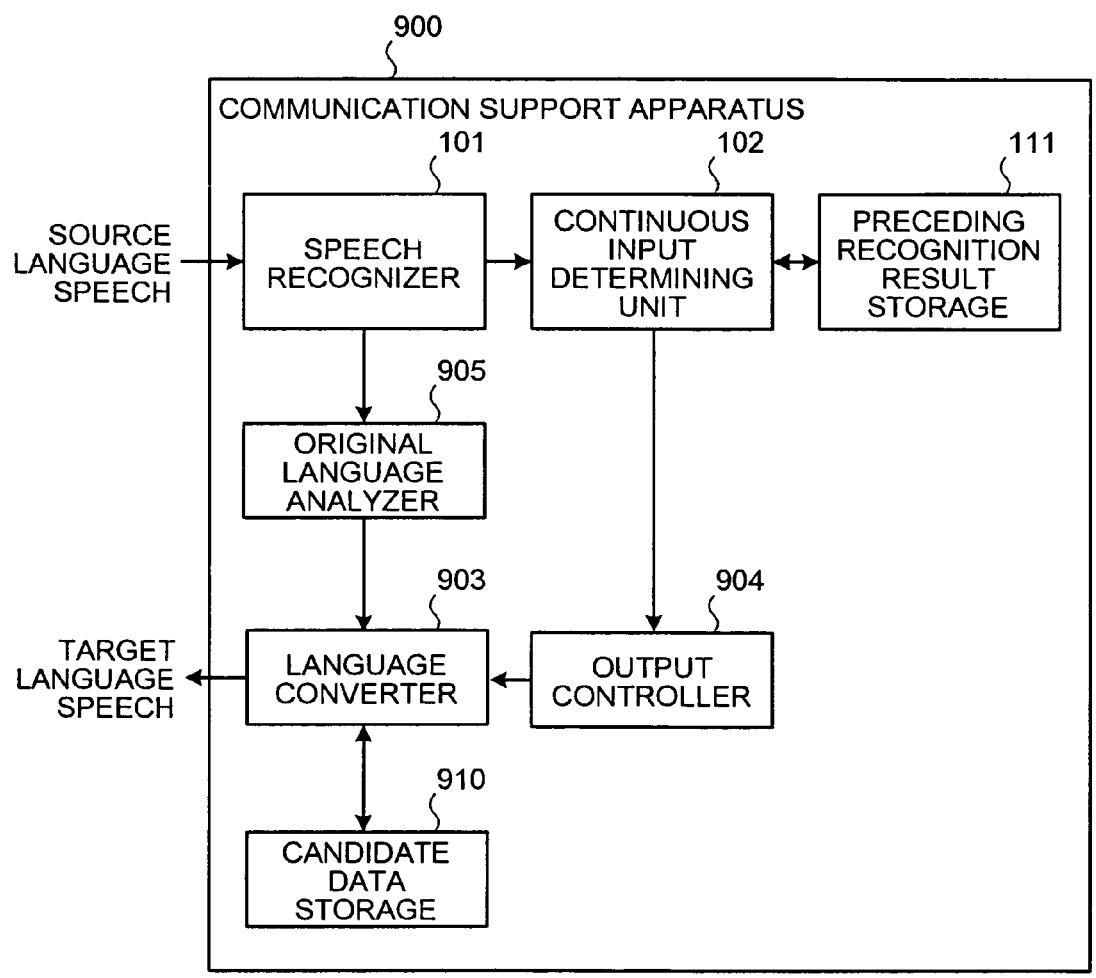

FIG.10A

| SOURCE LANGUAGE SENTENCE | NUMBER OF CANDIDATES | ANALYSIS CANDIDATE LIST 910 |
|---|---|---|
| かばんはいりません (KABAN WA IRIMASEN) | 2 | 1 = "鞄は (KABAN WA)/要り(IRI)(*want*) /ませ (MASE)/ん(N) <br> 2 = "鞄 (KABAN)/入り (HAIRI)(*contain*) /ませ (MASE)/ん(N) |

FIG.10B

| SOURCE LANGUAGE SENTENCE | NUMBER OF CANDIDATES | ANALYSIS CANDIDATE LIST 910 |
|---|---|---|
| 急いで走る太郎を見た (ISOIDE HASIRU TARO WO MITA) *I saw Taro running in hurry* | 2 | 1 = SYNTAX TREE 1 <br> 2 = SYNTAX TREE 2 |

FIG.10C

| SOURCE LANGUAGE SENTENCE | NUMBER OF CANDIDATES | ANALYSIS CANDIDATE LIST |
|---|---|---|
| 昨日買った本を読んだ<br>(KINO KATTA HON WO YONDA)<br>*I read the book bought yesterday* | 2 | 1 = "昨日 *yesterday* →<br>買った *bought*"<br>2 = "昨日 *yesterday* →<br>読んだ *read*" |

FIG.10D

| SOURCE LANGUAGE SENTENCE | NUMBER OF CANDIDATES | ANALYSIS CANDIDATE LIST |
|---|---|---|
| 太郎から本をもらった次郎はうれしかった。<br>彼は笑っていた。<br>(TARO KARA HON WO MORATTA JIRO WA URESIKATTA. KARE WA WARATTE ITA)<br>*Jiro, given a book from Taro, was pleased. He was smiling.* | 2 | 1 = "彼 (KARE) → 太郎 (TARO)"<br>2 = "彼 (KARE) → 次郎 (JIRO)" |

FIG.10E

| SOURCE LANGUAGE SENTENCE | NUMBER OF CANDIDATES | ANALYSIS CANDIDATE LIST 910 |
|---|---|---|
| 行けますか？<br>(IKE MASUKA?)<br>*Can I go?* | 2 | 1 = "私は行けますか (WATASHI WA IKE MASUKA) *Can I go?*<br>2 = "あなたは行けますか (ANATA WA IKE MASUKA) *Can you go?* |

FIG.10F

| SOURCE LANGUAGE SENTENCE | NUMBER OF CANDIDATES | ANALYSIS CANDIDATE LIST 910 |
|---|---|---|
| 結構です (KEKKO DESU) | 2 | 1 = "OK です" *I agree*<br>2 = "いりません" *I don't want it* |

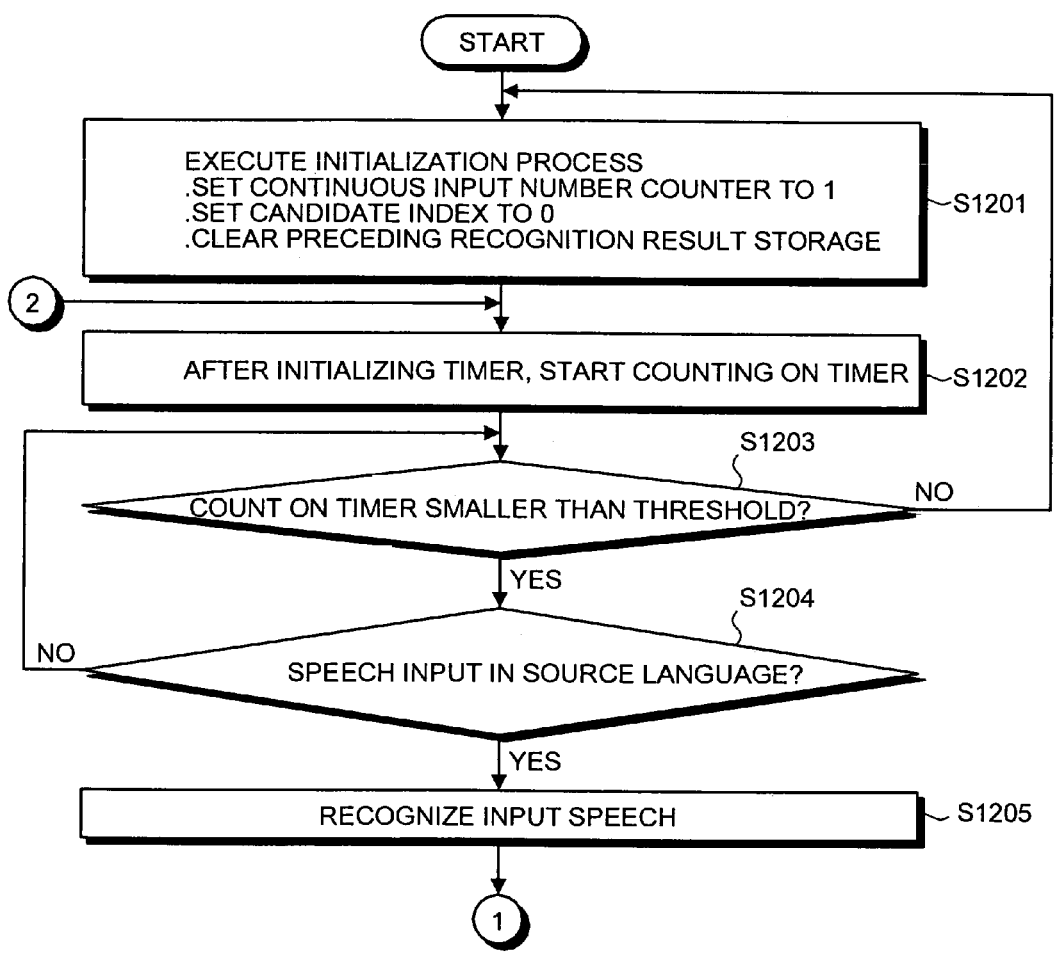

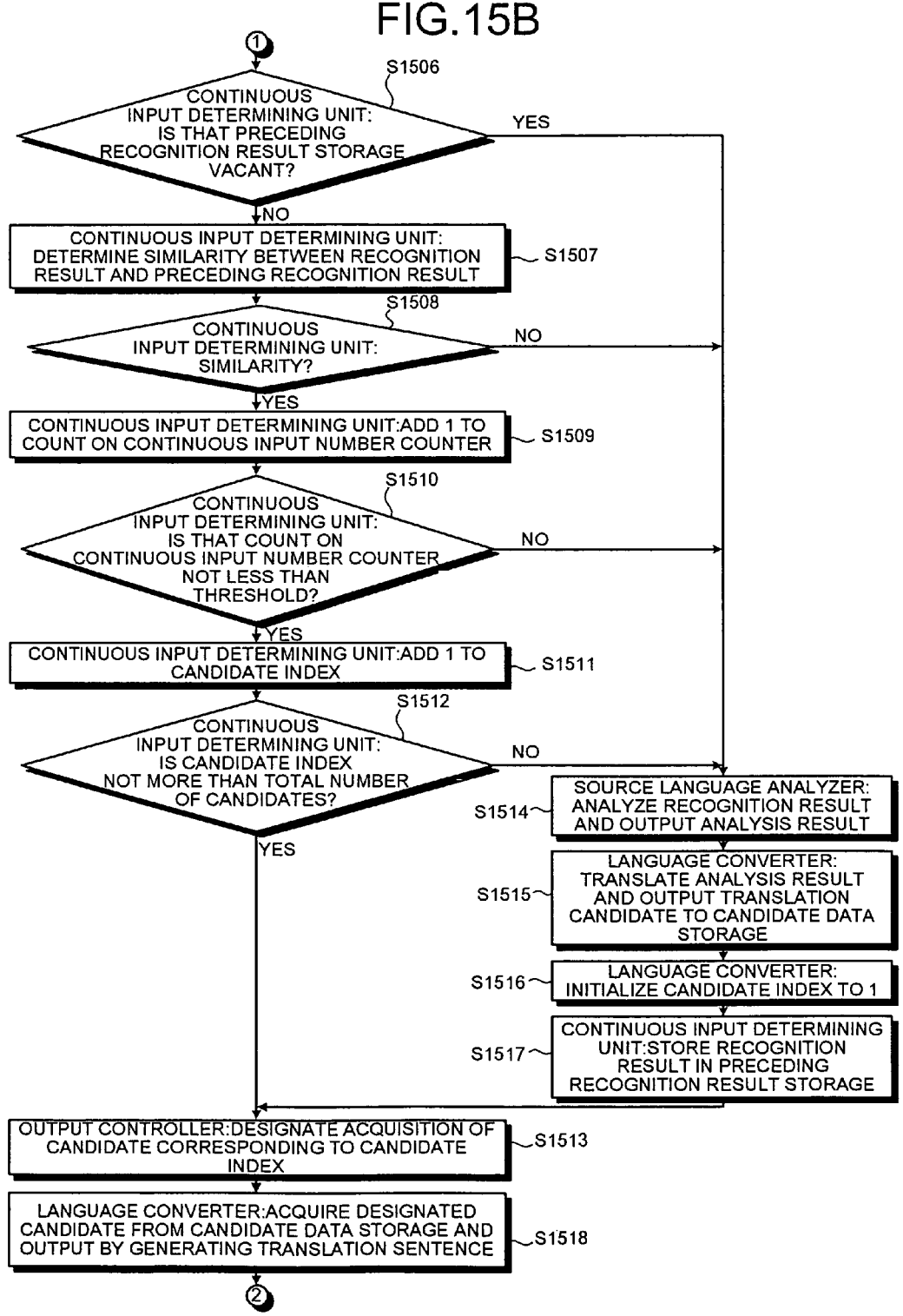

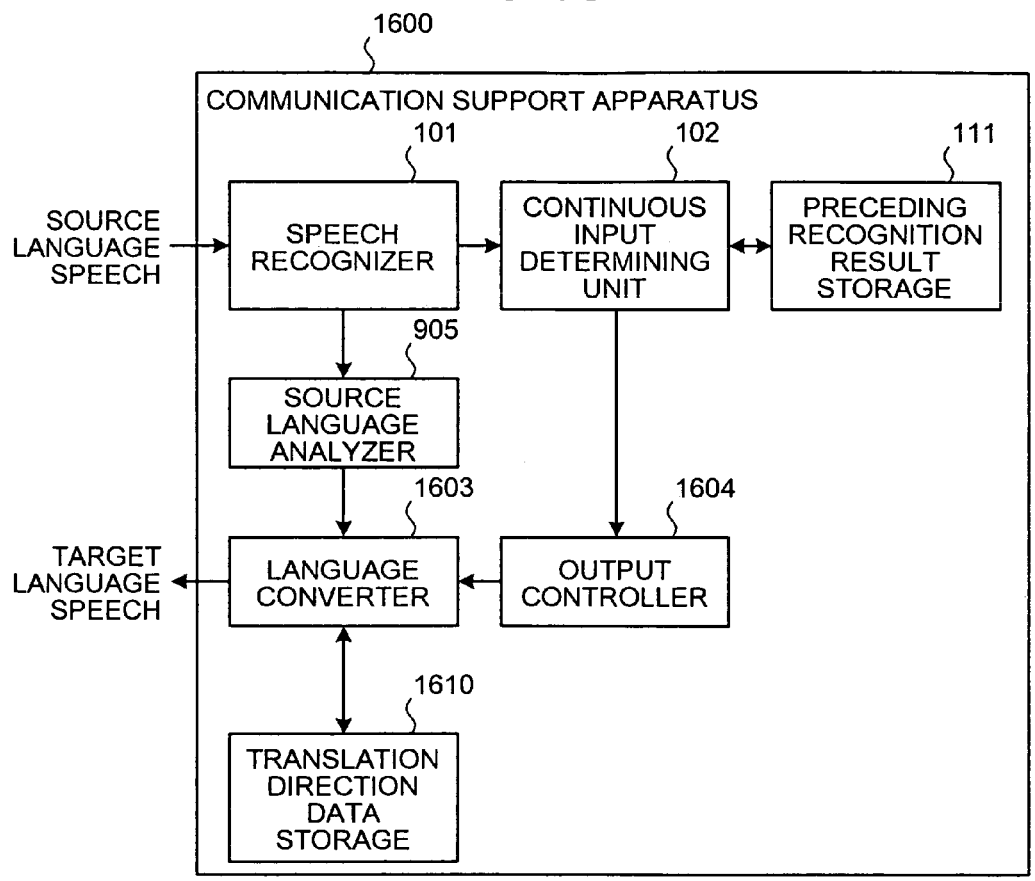

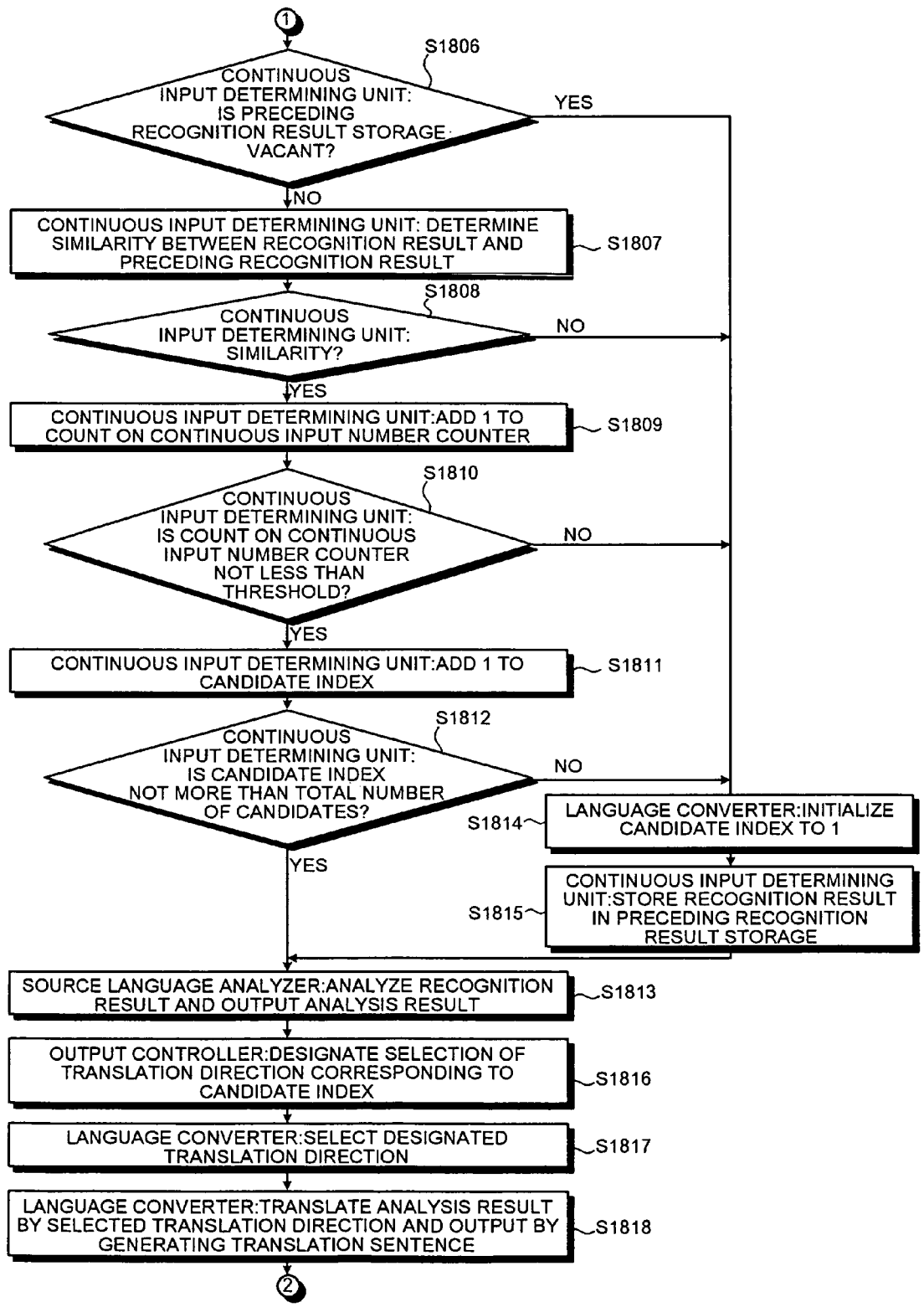

FIG.20

| CANDIDATE INDEX | PHONATION TYPE |
|---|---|
| 1 | PHONATION TYPE 1 (VOLUME = 1. SPEED = 1, PITCH = 1,...) |
| 2 | PHONATION TYPE 2 (VOLUME = 1, SPEED = 1, PITCH = 2,...) |
| : | : |

1910

APPARATUS, METHOD, AND COMPUTER PROGRAM PRODUCT FOR SUPPORTING COMMUNICATION THROUGH TRANSLATION BETWEEN LANGUAGES

CROSS-REFERENCE TO RELATED APPLICATIONS

This application is based upon and claims the benefit of priority from the prior Japanese Patent Application No. 2005-152989, filed on May 25, 2005; the entire contents of which are incorporated herein by reference.

BACKGROUND OF THE INVENTION

1. Field of the Invention

This invention relates to an apparatus, a method, and a computer program product for supporting communication through translation between a plurality of languages.

2. Description of the Related Art

In recent years, with the development of the natural language processing technique, a machine translation system in which a text written Japanese, for example, is translated into another language such as English has come to find practical applications and the use thereof has widely extended.

The development of the speech processing technique, on the other hand, has led to the use of a speech dictation system capable of aurally inputting a character string of the natural language by converting the utterances uttered by the user into characters and a speech synthesis system in which the sentences obtained as electronic data or a character string of the natural language output from the system are converted to a speech output.

Also, the progress of the image processing technique has realized a character recognition system in which the sentences in the image can be converted into a machine readable character data by analyzing the character image picked up by a camera or the like. Further, the advance of the handwritten character recognition technique has made possible a technique in which a handwritten text input by the user through a pen input unit or the like is converted into a machine readable character data.

The globalization of the culture and the economy, on the other hand, has increased the chance of communication between persons having different mother tongue. In view of this, demand has heightened for a communication support apparatus in which the natural language processing technique, the speech processing technique, the image processing technique and the handwritten character recognition technique described above are coordinated to support the communication between persons of different mother tongue.

The communication support apparatus described below, for example, is conceivable. First, a Japanese input by voice or pen from a Japanese-native speaker is converted to a machine readable Japanese text using the speech recognition technique or the handwritten character recognition technique. Next, the text is translated into an English text of an equivalent meaning using the machine translation technique, and the result is presented as an English character string, or presented to an English-native speaker in the form of the speech in English using the speech synthesis technique. On the other hand, an English input uttered or input by pen from an English-native speaker is presented in the form of a translated Japanese text to a Japanese-native speaker by executing the reverse process. Using this method, efforts are under way to implement a communication support apparatus capable of bilateral communication between persons having different mother tongue.

As another example, a communication support apparatus described below may be conceived. First, the image of a character string written on a local sign board or a warning expressed in English is picked up by a camera. Next, the character string the image of which has been picked up is converted into a machine readable English character string data using the image processing technique and the character recognition technique. Further, the English language text is translated into a Japanese text of an equivalent meaning using the machine translation technique, and the resulting Japanese character string is presented to the user. As an alternative, the text is presented to the user as a speech in Japanese using the speech synthesis technique. The development is under way to realize a communication support apparatus using this method by which a person who can speak and understand only Japanese and traveling in an English speaking area can understand an English text on a sign board or a warning.

With this communication support apparatus, it is very difficult to acquire a correct, error-free candidate through the process in which the text input in the source language by the user is recognized by the speech recognition process, the handwritten character recognition process or the image character recognition process and converted into a machine readable text data. Generally, therefore, the processing of a plurality of candidates for interpretation results in ambiguity.

Also in the machine translation process, ambiguity is caused when converting the source language sentence to a semantically equivalent the target language sentence, and in the presence of a plurality of translation sentence candidates, a semantically equivalent translation sentence cannot be uniquely selected, thereby often making it impossible to obviate the ambiguity.

The cause of ambiguity is probably derived from the fact that the source language sentence is an ambiguous expression having a plurality of interpretations, the highly context-dependent expression of the source language sentence develops a plurality of interpretations, or the different linguistic and cultural backgrounds and the different concept system between the source language and the target language results in a plurality of translation candidates.

In order to obviate this ambiguity, if there are a plurality of candidates, a method has been proposed in which the candidate first obtained is selected or a method in which a plurality of candidates are presented to the user allowing him to select one of them. A method has also been proposed in which a plurality of candidates, if any, are scored according to some criterion and a candidate high in score is selected. Japanese Patent Application Laid-open No. H07-334506 (hereinafter referred to as First Document), for example, proposes a technique in which a translation word having a high similarity of the concept remembered from the word is selected from a plurality of words obtained as the result of translation thereby to improve the quality of the translated text.

The method of First Document poses the problem, however, that although the burden on the user to select a translation word is eliminated, the criterion for scoring is difficult to set, and therefore the optimum candidate is not always selected and a translation sentence departing from the intention of the source language sentence may be output.

Further, the communication support apparatus described above is intended to support the communication between users having different languages which they can understand. Generally, the user cannot understand the target language output, and therefore the method allowing the user to select one of a plurality of candidates poses the problem that a translation error, if any, cannot be discovered and corrected.

When the communicative intention of a speech cannot be transmitted successfully to the other party due to a translation error, therefore, the user generally inputs the same text again. In the process, assume that a communication support apparatus is implemented by combining the speech recognition and the language translation. Even in the case where a translation error is caused by the failure of speech recognition, the speech recognition may succeed and the translation error may be avoided when the speech recognition process is executed again.

As long as a translation error occurs in the translation process after a successful speech recognition, however, the speech recognition output result still remains unchanged by the user inputting again the same text, and therefore the same translation error is repeated in the process and the same translation error cannot be avoided. Also, the repeated input operation increases the burden on the part of the user.

SUMMARY OF THE INVENTION

According to one aspect of the present invention, a communication support apparatus includes a speech recognizer that recognizes a first speech of a source language as a first source language sentence, and recognizes a second speech of the source language following the first speech as a second source language sentence; a determining unit that determines whether the second source language sentence is similar to the first source language sentence; and a language converter that translates the first source language sentence into a first translation sentence, and translates the second source language sentence into a second translation sentence different from the first translation sentence when the determining unit determines that the second language sentence is similar to the first language sentence.

According to another aspect of the present invention, a communication support apparatus includes a speech recognizer that recognizes a first speech of a source language as a first source language sentence, and recognizes a second speech of the source language following the first speech, as a second source language sentence; a determining unit that determines whether the second language sentence is similar to the first language sentence; a language converter that translates the first source language sentence into a first translation sentence, and translates the second source language sentence into a second translation sentence; and a speech synthesizer that synthesizes the first translation sentence into a third speech in accordance with a first phonation type, and synthesizes the second translation sentence into a fourth speech in accordance with a second phonation type different from the first phonation type when the determining unit determines that the second language sentence is similar to the first language sentence.

According to still another aspect of the present invention, a communication support method includes recognizing a first speech of a source language as a first source language sentence; translating the first source language sentence into a first translation sentence; recognizing a second speech of the source language following the first speech as a second source language sentence; determining whether the second language sentence is similar to the first language sentence; and translating the second source language sentence into a second translation sentence different from the first translation sentence when it is determined that the second language sentence is similar to the first language sentence.

According to still another aspect of the present invention, a communication support method includes recognizing a first speech of a source language as a first source language sentence; translating the first source language sentence into a first translation sentence; recognizing a second speech of the source language following the first speech as a second source language sentence; determining whether the second language sentence is similar to the first language sentence; translating the second source language sentence into a second translation sentence; and synthesizing the first translation sentence into a third speech in accordance with a first phonation type, and synthesizes the second translation sentence into a fourth speech in accordance with a second phonation type different from the first phonation type when it is determined that the second language sentence is similar to the first language sentence.

According to still another aspect of the present invention, a computer program product according to still another aspect of the present invention causes a computer to perform any one of the method according to the present invention.

BRIEF DESCRIPTION OF THE DRAWINGS

FIG. 1 is a block diagram showing a configuration of a communication support apparatus according to a first embodiment;

FIG. 2 shows an example of the data structure in a translation data storage unit;

FIG. 3 shows an example of the data structure in a candidate data storage unit;

FIG. 7 shows an example of data processed by the communication support process;

FIG. 9 is a block diagram showing a configuration of a communication support apparatus according to a second embodiment;

FIGS. 10A to 10F show examples of the data structure in a candidate data storage unit;

FIGS. 12A and 12B show a flowchart of a general flow of the communication support process according to the second embodiment;

FIGS. 15A and 15B show a flowchart of a general flow of the communication support process according to the third embodiment;

FIG. 16 is a block diagram showing a configuration of a communication support apparatus according to a fourth embodiment;

FIG. 17 shows an example of the data structure of a translation direction data storage unit;

FIGS. 18A and 18B show a flowchart of a general flow of the communication support process according to the fourth embodiment;

FIG. 20 shows an example of the data structure of a phonation type data storage unit.

DETAILED DESCRIPTION OF THE INVENTION

Figure 4:
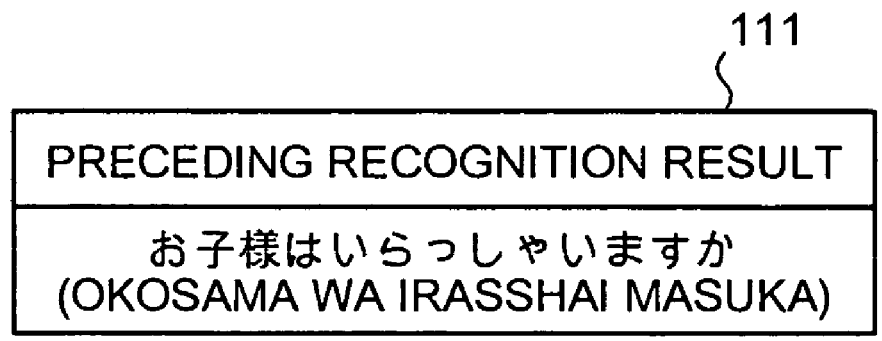
FIG. 4 shows an example of the data structure in a preceding recognition result storage unit.

A communication support apparatus, a communication support method and a computer program product according to preferred embodiments of the invention are described below with reference to the accompanying drawings.

In the communication support apparatus according to a first embodiment, a translation candidate sentence corresponding to the input source language sentence is selected and output from a translation data storage unit storing the sentences of the source language and the corresponding translation candidate. Assume that there are a plurality of translation candidate sentences corresponding to a source language sentence and that the selected translation candidate sentence is improper so that the user inputs a similar source language sentence continuously. In such a case, a translation candidate sentence different from the first selected one is selected for the subsequently input source language sentence and output as a translation sentence.

The "translation sentence" is defined as a corresponding sentence in the target language output for the source language sentence input, and one translation sentence is output for one source language sentence. The "translation candidate sentence", on the other hand, is defined as a sentence qualified to be a candidate for the translation sentence for the source language sentence and stored in the translation data storage unit as a sentence corresponding to the source language sentence. A plurality of translation candidate sentences can exist for a single source language sentence. The source language sentence, the translation sentence and the translation candidate sentence may be any one of a sentence, a paragraph, a phrase, a clause and a word as well as a sentence defined by the period.

The communication support apparatus according to the first embodiment can be used for machine translation of direct conversion type such as the example-based translation or the statistics-based translation conducted by reference to the information stored as the source language sentence and a translation sentence corresponding to the particular source language sentence.

FIG. 1 is a block diagram showing a configuration of the communication support apparatus 100 according to a first embodiment. As shown in FIG. 1, the communication support apparatus 100 includes a speech recognizer 101, a continuous input determining unit 102, a language converter 103, an output controller 104, a candidate data storage 110, a preceding recognition result storage 111 and a translation data storage 112.

The translation data storage 112 is for storing a sentence in the source language and at least one corresponding translation candidate sentence in the target language having the same meaning as the source language sentence. The translation data storage 112 is accessed when a translation candidate sentence for the input source language sentence is selected and output as a translation sentence by the language converter 103.

FIG. 2 shows an example of the data structure of the translation data storage 112. As shown in FIG. 2, the translation data storage 112 stores the sentences in the source language and a corresponding translation candidate list including a plurality of translation candidate sentences for each source language sentence, arranged in a predetermined order of priority. For example, the translation candidate list including the translation candidate sentences "Excuse me" and "I'm sorry" in English is stored for the sentence "SUMI MASEN" in Japanese, the source language. In the translation candidate list, the candidate index to identify each translation candidate sentence uniquely is attached in the order of priority of each translation candidate sentence. A value predetermined by the appearance frequency of a translation candidate sentence is used as the priority.

FIG. 2 shows a case in which the source language is Japanese and the target language is English. Nevertheless, similar data can be stored in the translation data storage 112 for all the languages that can be handled by the communication support apparatus 100.

The candidate data storage 110 is for storing a source language sentence and at least a corresponding translation candidate sentence which is the result of searching the translation data storage 112 with the source language sentence as a search key. The candidate data storage 110 is for temporarily storing the translation candidate sentence corresponding to the source language sentence and accessed when the language converter 103 selects a translation candidate sentence from a plurality of the translation candidate sentences in accordance with the designation from the output controller 104.

FIG. 3 shows an example of the data structure of the candidate data storage 110. As shown in FIG. 3, the candidate data storage 110 stores, in correspondence with each other, the source language sentence recognized and output by the speech recognizer 101, the number of candidates constituting the number of translation candidate sentences retrieved from the translation data storage 112 by the language converter 103 for the particular source language sentence and a translation candidate list including one or plurality of translation candidates.

The preceding recognition result storage 111 is for storing the source language sentence recognized and output just before by the speech recognizer 101 (see FIG. 4), and is accessed for determining whether a similar source language sentence is continuously input or not by the continuous input determining unit 102.

The speech recognizer 101 receives the speech in the source language uttered by the user and by speech recognition, outputs the source language sentence written as and utterance to the continuous input determining unit 102 and the language converter 103. The speech recognition process is executed by the speech recognizer 101 according to a generally used speech recognition method such as Linear Predictive Coefficient (LPC) analysis, hidden Markov model (HMM), dynamic programming, neural network or N-gram language model.

In the similarity determination made by the continuous input determining unit 102, the degree of similarity is calculated as a numerical value by comparing the degree of coincidence or noncoincidence of a symbol series such as a character string using the HMM, the dynamic programming or the neural network. As an alternative, the editing distance between the character strings of the two language sentences are compared with each other thereby to calculate the similarity degree as a numerical value.

The "editing distance" is defined as the number of operations of character edition for converting one character to another. The calculation of the editing distance can use any conventional method including Smith-Waterman method. When the similarity degree thus calculated exceeds a predetermined value, the similarity between the source language sentence and the preceding recognition result is established.

The language converter 103 receives the source language sentence output from the speech recognizer 101, and searches the translation candidate list stored in the translation data storage 112 for the translation candidate sentence corresponding to the received source language sentence. The translation candidate sentence thus retrieved is output to the candidate data storage 110. At the same time, the translation candidate sentence corresponding to the candidate index designated by the output controller 104 described later is acquired from the translation candidate list stored in the candidate data storage 110 and output as a translation sentence.

The language converter 103 may be configured to output a translation sentence as a text to an output unit (not shown) such as a display, or as a speech synthesized by the speech synthesis function.

When the continuous input determining unit 102 determines that a similar source language sentence is continuously input, the output controller 104 controls the output process of the language converter 103 in such a manner that the language converter 103 selects and outputs a translation candidate sentence different from the one previously selected for the subsequently input source language sentence. In the presence of only one translation candidate sentence corresponding to the input source language sentence, the process for switching the selected translation candidate sentence is not executed.

Figure 5:
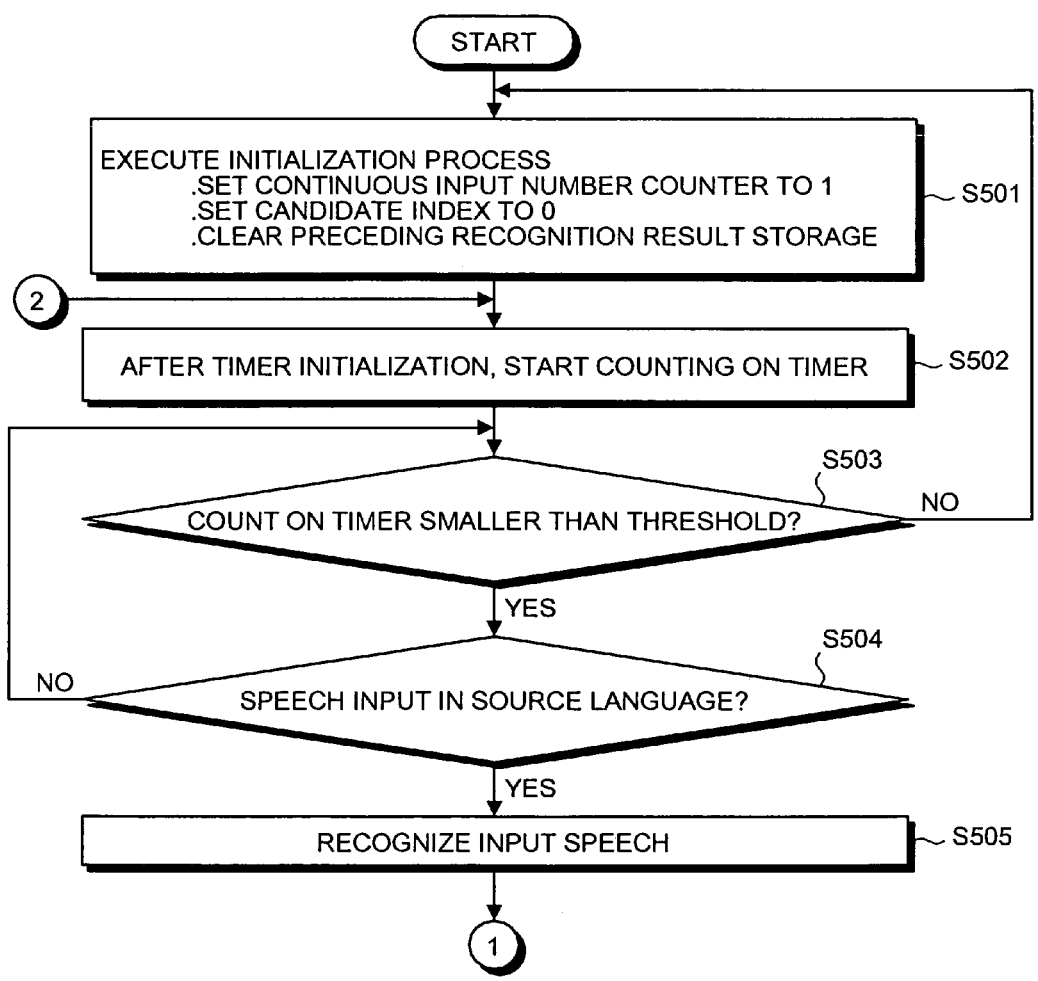
FIGS. 5 and 6 show a flowchart of the general flow of the communication support process according to the first embodiment.
Figure 6:
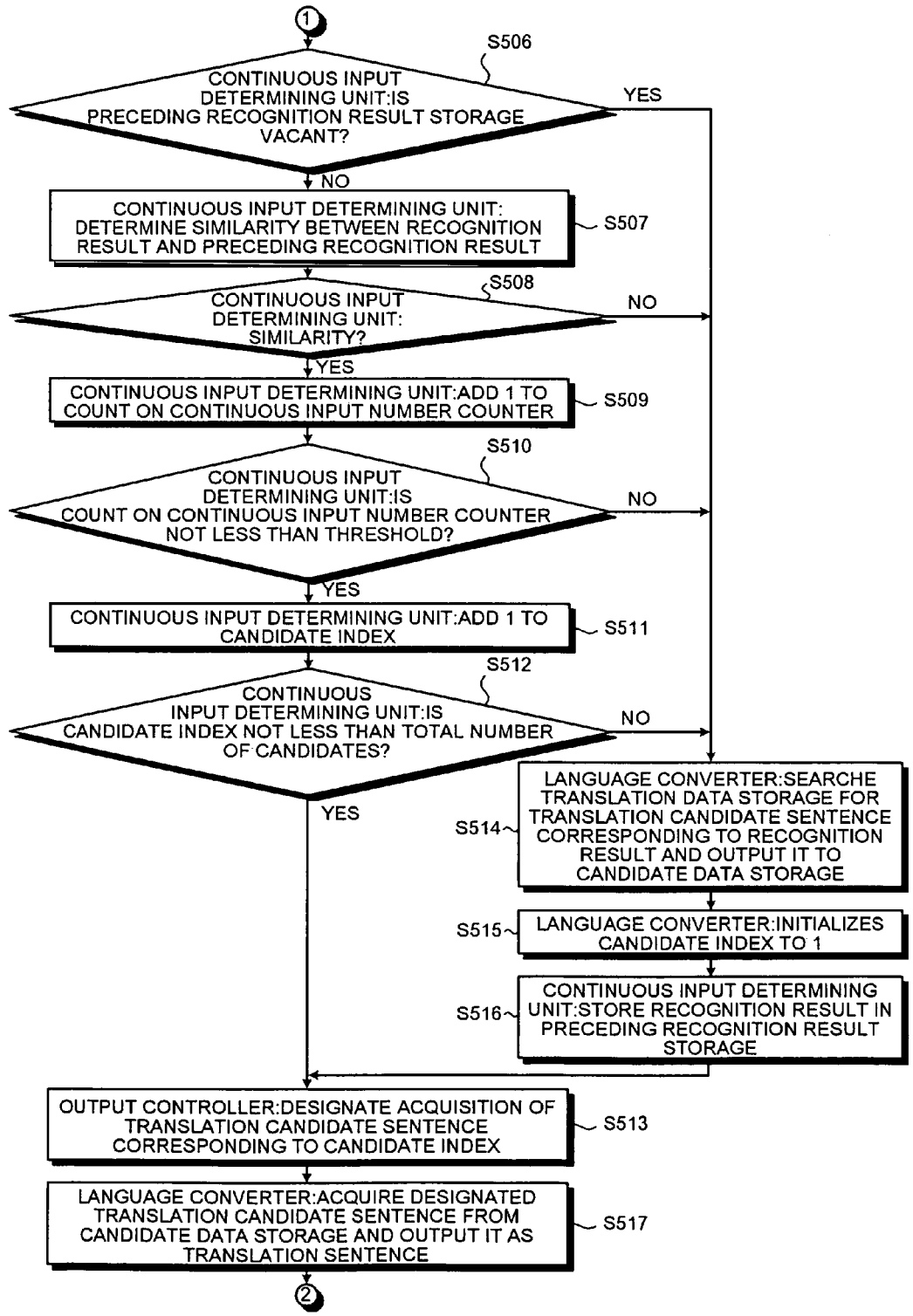

Next, the communication support process executed by the communication support apparatus 100 according to the first embodiment configured as described above is explained. FIGS. 5 and 6 show a flowchart of a general flow of the communication support process according to the first embodiment.

First, the speech recognizer 101 executes the initialization process (step S501). In the initialization process, the continuous input number counter is set to one (1) and the candidate index to zero (0), while at the same time clearing the preceding recognition result storage 111.

After timer initialization, the speech recognizer 101 starts counting the time on the timer (step S502). After that, the speech recognizer 101 determines whether the count on the timer is less than a predetermined threshold value or not (step S503), and in the case where the count on the timer is not less than the threshold value. (NO at step S503), executes the initialization process again and repeats the process (step S501). When similar speechs are continuously input after the lapse of a predetermined time, the user may have uttered in a different situation or to a different person, and therefore it is not determined that the speech is continuously input by repetition. Thus, the translation candidate output process is required to be executed again from the beginning.

When step S503 determines that the count on the timer is less than the threshold value (YES at step S503), the speech recognizer 101 determines whether the speech is input in the source language or not (step S504).

When no such speech is input (NO at step S504), the process is returned to the comparison between the count on the timer and the threshold value again (step S503). When the speech is input (YES at step S504), on the other hand, the speech recognizer 101 recognizes the input speech (step S505).

Next, the continuous input determining unit 102 determines whether the preceding recognition result storage 111 is vacant or not, i.e. whether the preceding recognition result is stored or not (step S506).

When the preceding recognition result storage 111 is vacant (YES at step S506), the language converter 103 searches the translation data storage 112 for a translation candidate sentence corresponding to the source language sentence which is the recognition result, and outputs it to the candidate data storage 110 (step S514). This is because in the absence of the preceding recognition result, the translation candidate sentence corresponding to the present recognition result is required to be acquired. The number of the translation candidate sentences retrieved from the translation data storage 112 is set in the candidate number column of the candidate data storage 110.

When the preceding recognition result storage 111 is not vacant (NO at step S506), on the other hand, the continuous input determining unit 102 determines the similarity between the recognition result received from the speech recognizer 101 and the preceding recognition result stored in the preceding recognition result storage 111 (step S507).

The continuous input determining unit 102 determines whether the recognition result and the preceding recognition result are similar to each other or not (step S508), and in the case where they are not similar (NO at step S508), the translation candidate output process is executed by the language converter 103 (step S514). This is by reason of the fact that a different language sentence is considered to have been input by the user and therefore a translation candidate sentence corresponding to the particular source language sentence is required to be acquired anew.

When the recognition result and the preceding recognition result are similar to each other (YES at step S508), on the other hand, the continuous input determining unit 102 adds one (1) to the count on the continuous number counter (step S509). Next, the continuous input determining unit 102 determines whether the count on the continuous input number counter is not less than a predetermined threshold value or not (step S510).

When the continuous input number is less than the threshold value (NO at step S510), the translation candidate output process is executed by the language converter 103 (step S514).

When the count on the continuous input number counter is not less than the predetermined threshold value (YES at step S510), on the other hand, the continuous input determining unit 102 adds one (1) to the candidate index (step S511).

Next, the continuous input determining unit 102 determines whether the candidate index is not more than the total number of candidates or not (step S512). The total number of candidates can be acquired from the candidate number column of the candidate data storage 110. When the candidate index exceeds the total number of candidates (NO at step S512), the translation candidate output process is executed by the language converter 103 (step S514), by reason of the fact that in the absence of the translation candidate sentence corresponding to the candidate index, the translation candidate output process is required to be restarted.

When the candidate index is not more than the total number of candidates (YES at step S512), the output controller 104 instructs the language converter 103 to acquire the translation candidate sentence corresponding to the candidate index to which one (1) is added at step S511, from the candidate data storage 110 (step S513).

Assume, for example, that the translation candidate sentence to be output is switched in the case where a similar source language sentence is input three times continuously. In this case, the threshold value is set to three (3) in advance. Upon the continuous input of a similar source language sentence three times, therefore, the count on the continuous input number counter reaches three (3), i.e. the threshold value (equal to 3) (YES at step S510). Therefore, the output controller 104 gives an instruction to acquire a translation candidate sentence corresponding to the candidate index plus one (1).

At step S514, the language converter 103 searches the translation data storage 112 for a translation candidate sentence corresponding to the source language sentence constituting the recognition result, and outputs it to the candidate data storage 110. After that, the language converter 103 initializes the candidate index to one (1) (step S515). Next, the continuous input determining unit 102 stores the recognition result in the preceding recognition result storage 111 (step S516).

Next, the output controller 104 instructs the language converter 103 to acquire a translation candidate sentence corresponding to the initialized candidate index (equal to 1), i.e. the translation candidate sentence at the top in the translation candidate list from the candidate data storage 110 (step S513).

The language converter 103 then acquires the translation candidate sentence designated by the output controller 104 from the candidate data storage 110 and outputs it (step S517), followed by returning to the timer count starting process (step S502) to receive the next input and repeat the process.

Next, a specific example of the communication support process executed according to the steps described above is explained. FIG. 7 is a diagram for explaining an example of the data processed by the communication support process. To simplify the explanation, assume that the threshold value of the count on the continuous input number counter is set to two (2), and the data shown in FIG. 2 are stored in the translation data storage 112.

First, assume that the user inputs the speech "OKOSAMA WA IRASSHAI MASUKA" meaning "Do you have any children?" at time point t0 (YES at step S504). In response, assume that the speech recognizer 101 recognizes the speech (step S505) and outputs the correct recognition result, i.e. "OKOSAMA WA IRASSHAI MASUKA" at time point t1. As of time point t2, the preceding recognition result storage 111 is vacant (YES at step S506). Thus, the language converter 103 executes the normal translation candidate sentence search process, and at time point t3, outputs two translation candidate sentences including "Will your child come here?" as a first translation candidate sentence and "Do you have any children" as a second translation candidate sentence (step S514).

Next, at time point t4, the language converter 103 sets the first candidate index (step S515), and the preceding recognition result storage 111 stores the wording "OKOSAMA WA IRASSHAI MASUKA" (step S516). Then, at time point t5, the language converter 103 outputs, as a translation sentence, the first translation candidate sentence "Will your child come here?" corresponding to the candidate index 1 designated by the output controller 104 (step S517).

In this case, at time point t9, the continuous input determining unit 102 determines that the present recognition result and the preceding recognition result are similar to each other (step S508), and adds one (1) to the count on the continuous input number counter (step S509). At time point t10, the continuous input determining unit 102 also detects that the continuous input number reaches the threshold value (equal to 2) (step S510), and at time point t11, adds one (1) to the candidate index (step S511). At time point t12, the language converter 103 outputs, as a translation sentence, the second translation candidate sentence "Do you have any children?" different from the preceding session designated by the output controller 104 (step S517), and thus the interpretation ends in success (time point t13).

As described above, according to the prior art, a similar process to the preceding session is executed even in the case of repeated input, often causing the same failure. According to this embodiment, in contrast, the process described above can avoid the repetition of the same failure.

Next, an example of display on the screen displayed by the communication support apparatus 100 according to the first embodiment is explained. FIGS. 8A to 8D show examples of the display screen. The display screen is displayed on an output unit (not shown) such as a display of this apparatus.

Figure 8A:
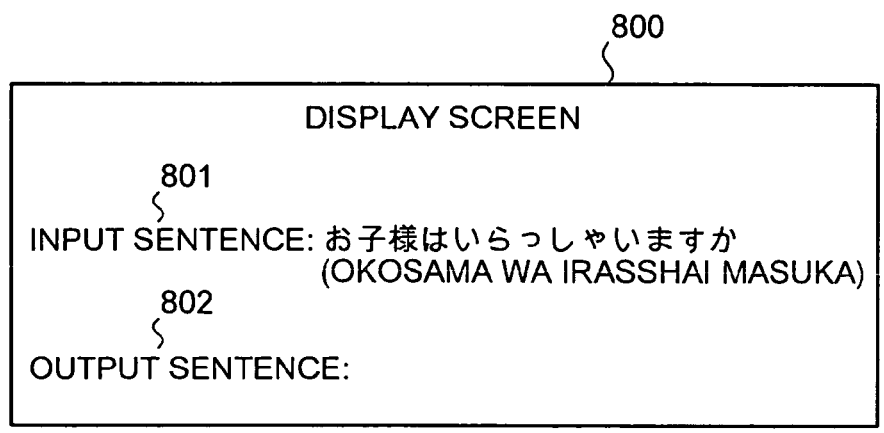
FIGS. 8A to 8D show examples of the display screen.

FIG. 8A shows the display screen 800 displaying the recognition result of the first input speech. The display screen 800 is an example in which "OKOSAMA WA IRASSHAI MASUKA" representing the speech recognition result is displayed in the input sentence 801. At this time point, the output sentence 802 representing the translation result is not displayed.

Figure 8B:
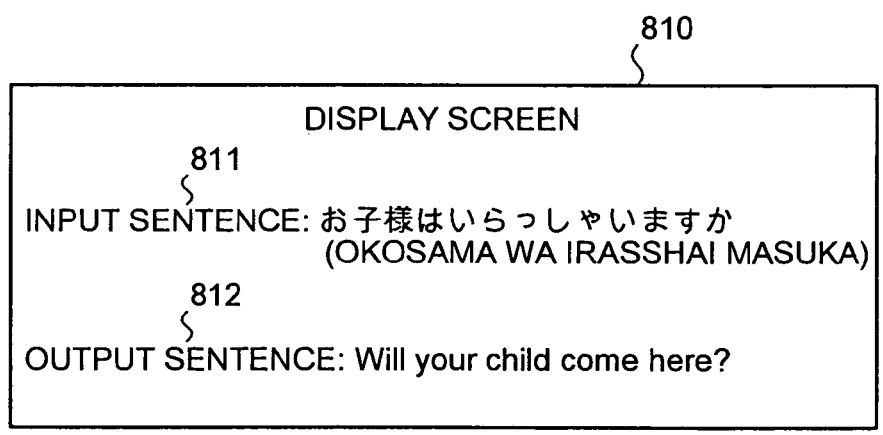

FIG. 8B shows the display screen 810 displaying the recognition result of the first input speech and the corresponding translation result. This shows a case in which the output sentence 812 "Will your child come here?" representing the translation result corresponding to the input sentence 811 is displayed on the display screen 810.

Figure 8C:
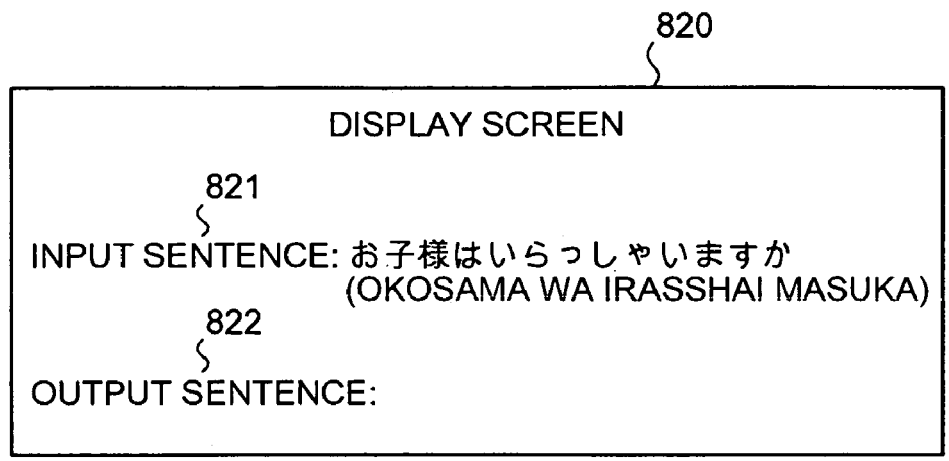

FIG. 8C shows the display screen 820 displaying, as a translation failure, the recognition result of the repeatedly input speech and a corresponding translation result. The display screen 820 displays the speech recognition result "OKOSAMA WA IRASSHAI MASUKA" in the input sentence 821. At this time point, the output sentence 822 constituting the translation result is not displayed.

Figure 8D:
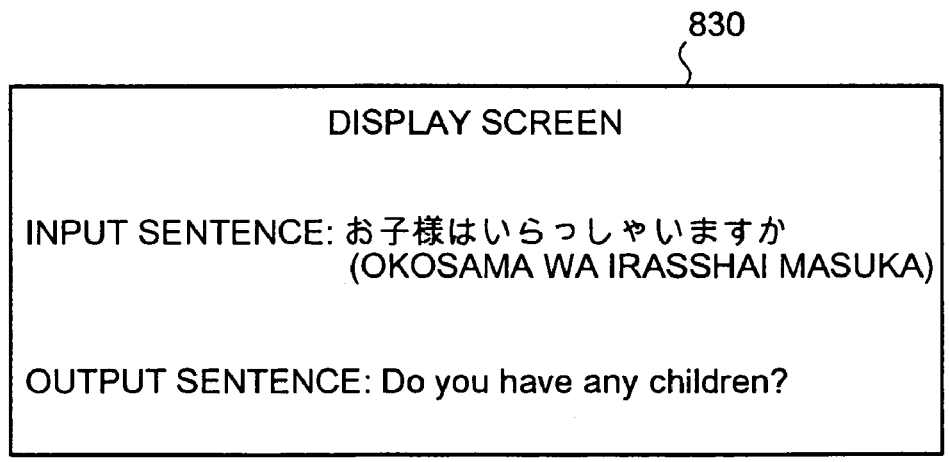

FIG. 8D shows the recognition result of the repeatedly input speech and a corresponding translation result displayed on the display screen 830. This shows a case in which the output sentence 832 "Do you have any children?" constituting a translation result different from the first output translation result corresponding to the input sentence 831 is displayed on the display screen 830.

When the same speech is continuously input as described above, a different output sentence can be displayed on the screen without any special operation on the part of the user. The display screen may alternatively be configured not to display the output sentence, but only the synthesized speech of the output sentence in the target language may be output.

As described above, with the communication support 100 apparatus according to the first embodiment, assume that similar speech recognition results are obtained continuously. A translation candidate sentence different from the first output one can be retrieved from the translation data storage and output as a translation candidate sentence for the subsequently recognized source language sentence. Even in the case where a translation error causes the user to input a similar source language sentence, therefore, the same translation error is not repeated, with the result that the burden on the part of the user to input a similar source language sentence again is reduced and an appropriate translation sentence can be output.

In a communication support apparatus according to a second embodiment, the meaning of the source language sentence is analyzed and the source language sentence is translated into and output as a corresponding target language sentence. In the process, assume that a plurality of candidates for the analysis result of the source language sentence exist and a selected candidate is improper resulting in a translation error, so that the user inputs a similar source language sentence continuously. A candidate different from the first selected candidate is selected for the subsequently input source language sentence, and a corresponding translation sentence is output.

The communication support apparatus according to the second embodiment can be used for machine translation of what is called transfer type in which the source language sentence is analyzed, the analysis result is converted and a translation sentence is generated from the conversion result.

FIG. 9 is a block diagram showing a configuration of the communication support apparatus 900 according to the second embodiment. As shown in FIG. 9, the communication support apparatus 900 includes a speech recognizer 101, a continuous input determining unit 102, a language converter 903, an output controller 904, a source language analyzer 905, a candidate data storage 910 and a preceding recognition result storage 111.

The second embodiment is different from the first embodiment in that in the second embodiment, the source language analyzer 905 is added, the functions of the language converter 903 and the output controller 904 and the data structure of the candidate data storage 910 are different from those of the first embodiment. The other parts of the configuration and the functions remain the same as those of the communication support apparatus 100 according to the first embodiment shown in the block diagram of FIG. 1 and therefore, being designated by the same reference numerals, respectively, not described again.

The source language analyzer 905 receives the source language sentence recognized by the speech recognizer 101, and after executing the natural language analysis process such as the morphological analysis, the parsing, the modification analysis, the anaphoric relation analysis, the ellipsis resolution analysis and the communicative intention analysis with reference to the vocabulary information and the grammatical rules of the source language, outputs an analysis result candidate for interpretation of the meaning expressed by the source language sentence. The analysis result candidate to be output may be the result of any of the above-mentioned natural language analysis processing (morphological analysis, parsing, modification analysis, anaphoric relation analysis, ellipsis resolution analysis and communicative intention analysis).

The natural language analysis processing executed by the source language analyzer 905 may use any of the generally used methods including the morphological analysis by the CYK method and the parsing by the Earley algorithm, the Chart algorithm and the generalized left to right (LR) parsing. Also, the dictionary of the natural language processing storing the morphological information, the sentence structure information, the grammatical rules and the translation rules is stored in a widely used storage such as a HDD (hard disk drive), an optical disk or a memory card, and accessed for the natural language analysis processing of the aforementioned algorithms.

The language converter 903 selects one of the analysis result candidates output from the source language analyzer 905, translates the analysis result candidate into a target language sentence having the same meaning as the analysis result candidate, and outputs it as a translation sentence. In the process, the language converter 903 selects the analysis result candidate corresponding to the candidate index designated by the output controller 904 described later. The language converter 903 corresponds to the portion of machine translation of transfer type which executes the sentence conversion and generation processes.

The output controller 904 controls the analysis result candidate select process executed by the language converter 903 in such a manner that upon determination by the continuous input determining unit 102 that a similar source language sentence is continuously input, the language converter 903 selects an analysis result candidate different from the previously selected one for the subsequently input source language sentence. When there is only one analysis result candidate corresponding to the input source language sentence, the process of controlling the switching of the analysis result candidate to be selected is not executed.

The candidate data storage 910 stores a source language sentence and at least one corresponding analysis result candidate resulting from the analysis of the particular source language sentence by the source language analyzer 905. FIGS. 10A to 10F show examples of the data structure of the candidate data storage 910.

As shown in FIGS. 10A to 10F, the candidate data storage 910 stores, in correspondence with each other, the source language sentence recognized and output by the speech recognizer 101, the number of candidates constituting the number of the analysis result candidates output from the source language analyzer 905 for the particular source language sentence and an analysis candidate list including one or a plurality of analysis result candidates.

As an alternative, the source language analyzer 905 may score the analysis result candidates and store them in the candidate data storage 910 with the candidate index attached to each of them in the order of priority. Any of the conventionally known methods including the one described in First Document may be used as a scoring method. This configuration can select the proper candidates in order and therefore can output a more proper translation sentence.

The candidate data storage 910 stores a different analysis result depending on the method employed for analysis processing. FIG. 10A shows a case in which the analysis result of the morphological analysis process is stored, FIG. 10B a case in which the analysis result of parsing is stored, FIG. 10C a case in which the analysis result of the modification analysis is stored, FIG. 10D a case in which the analysis result of the anaphoric analysis is stored, FIG. 10E a case in which the analysis result of the ellipsis resolution analysis is stored, and FIG. 10F a case in which the analysis result of the communicative intention analysis is stored.

In the case shown in FIG. 10A, the source language sentence "KABAN WA IRI MASE N" is associated with two morphological analysis result candidates including "KABEN/WA/IRI/MASE/N" and "KABAN/HAIRI/MASE/N" stored in an analysis candidate list. In the analysis candidate list, a candidate index is attached to uniquely identify each analysis result candidate.

In the case shown in FIG. 10*b*, the source language sentence "ISOIDE HASIRU TARO WO MITA" is associated with two parsing result candidates including "a first syntax tree" and "a second syntax tree" stored in an analysis candidate list. The first syntax tree and the second syntax tree indicate the parsing result expressed in a tree structure.

Figure 11A:
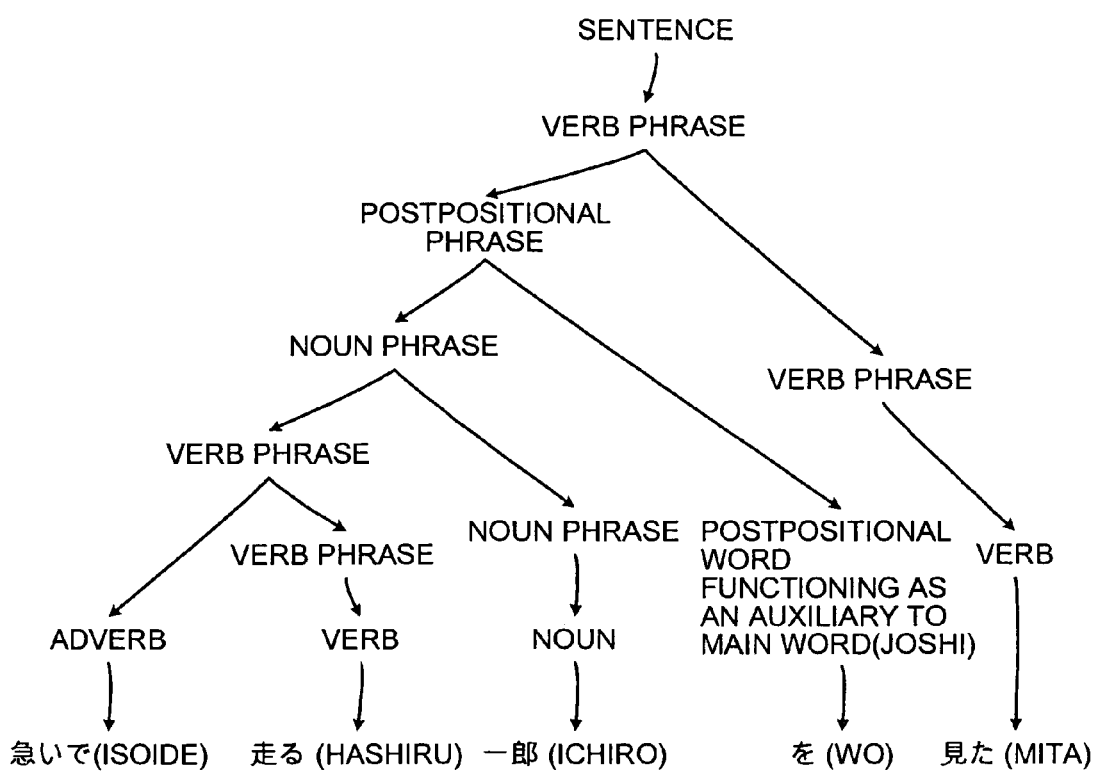
FIGS. 11A and 11B show examples of the parsing result as expressed by a tree structure.
Figure 11B:
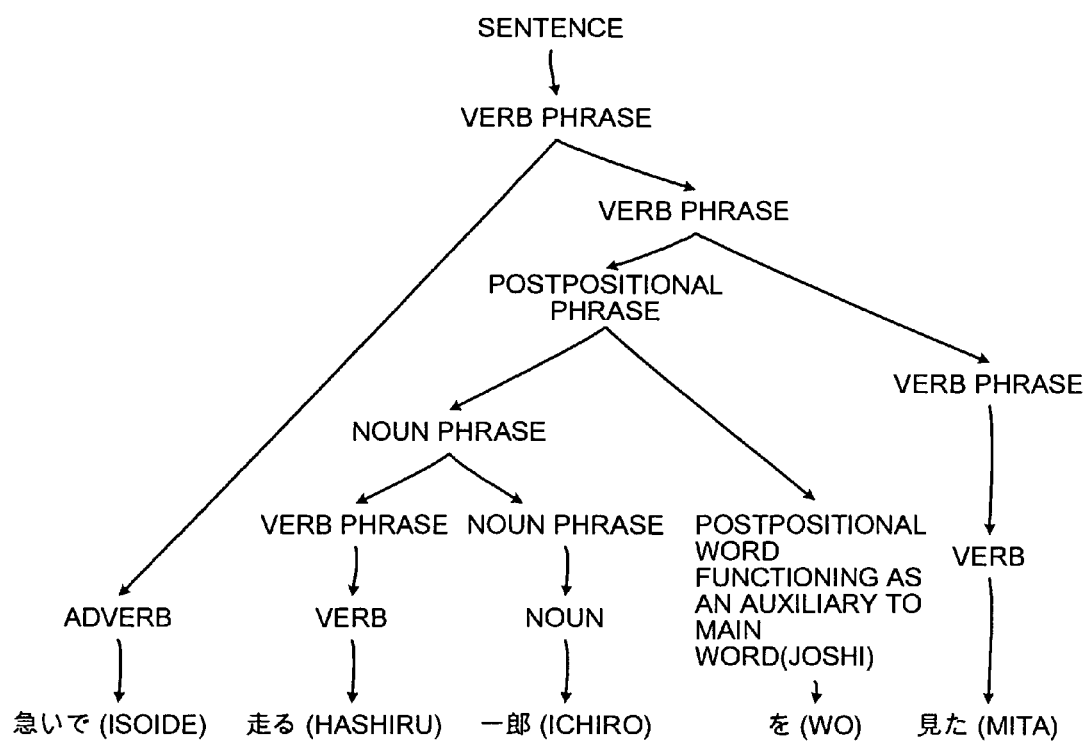

FIGS. 11A and 11B show examples of the parsing result expressed in tree structure. FIG. 11 is citation from "Hozumi Tanaka: Natural Language Processing, Fundamentals and Applications, published by The Institute of Electronics, Information and Communication Engineers, ISBN4-88552-160-2, 1999, p. 22, FIG. 14". FIGS. 11A and 11B show two tree structures, i.e. the first syntax tree and the second syntax tree, constituting the parsing result output for the source language sentence "ISOIDE HASIRU TARO WO MITA". The first syntax tree indicates a structure in which the adverb "ISOIDE" modifies the verb clause containing only the verb "HASIRU" thereby to form one verb phrase. The second syntax tree, on the other hand, indicates a structure in which the adverb "ISOIDE" modifies the whole verb phrase "HASIRU ICHIRO WO MITA" thereby constituting a verb phrase corresponding to the whole sentence. The parsing result is stored as an analysis result candidate in the analysis candidate list with a candidate index attached to this tree structure data.

In the case shown in FIG. 10C, the source language sentence "KINO KATTA HON WO YONDA (in English, 'I read the book I bought yesterday.')" is associated with two modification relation analysis result candidates including "KINO->KATTA" and "KINO->YONDA" stored in an analysis candidate list. Specifically, in this case, the two analysis result candidates are output in accordance with which is modified "KATTA" or "YONDA" by the word "KINO".

In the case shown in FIG. 10d, on the other hand, the source language sentence "TARO KARA HON WO MORATTA JITO WA URESIKATTA (in English, 'Jiro, given a book from Taro, was pleased. He was smiling.')" is associated with two anaphoric relation analysis result candidates including "KARE->TARO" and "KARE->JIRO" stored in the analysis candidate list. Specifically, in this case, the two analysis result candidates are output depending on which, TARO or JIRO, is indicated by "KARE".

In the case shown in FIG. 10E, the source language sentence "IKE MASUKA (in English, 'Can * go?')" is associated with two ellipsis resolution analysis result candidates including "WATASHI WA IKE MASUKA (in English, 'Can I go?')" and "ANATA WA IKEMASUKA (in English, 'Can you go?')" stored in the analysis candidate list. Specifically, in this case, the two analysis result candidates are output depending on which, "WATASHI" or "ANATA", is omitted as a subject.

In the case shown in FIG. 10f, the source language sentence "KEKKO DESU" is associated with two communicative intention analysis result candidates including "OK DESU (in English, 'I agree.'" and "IRIMASEN (in English, 'I do not want it.')" stored in the analysis candidate list. Specifically, in this case, the wording "KEKKO DESU" is either affirmative or negative in meaning and therefore two analysis result candidates are output as a communicative intention.

The analysis result candidates are not limited to any one of FIGS. 10A to 10F described above. Specifically, among the morphological analysis, parsing, modification analysis, anaphoric relation analysis, ellipsis resolution analysis and the communicative intention analysis, a plurality of analysis result candidates can be stored in the candidate data storage 910 and controlled for select process by the output controller 904.

Figure 12B:
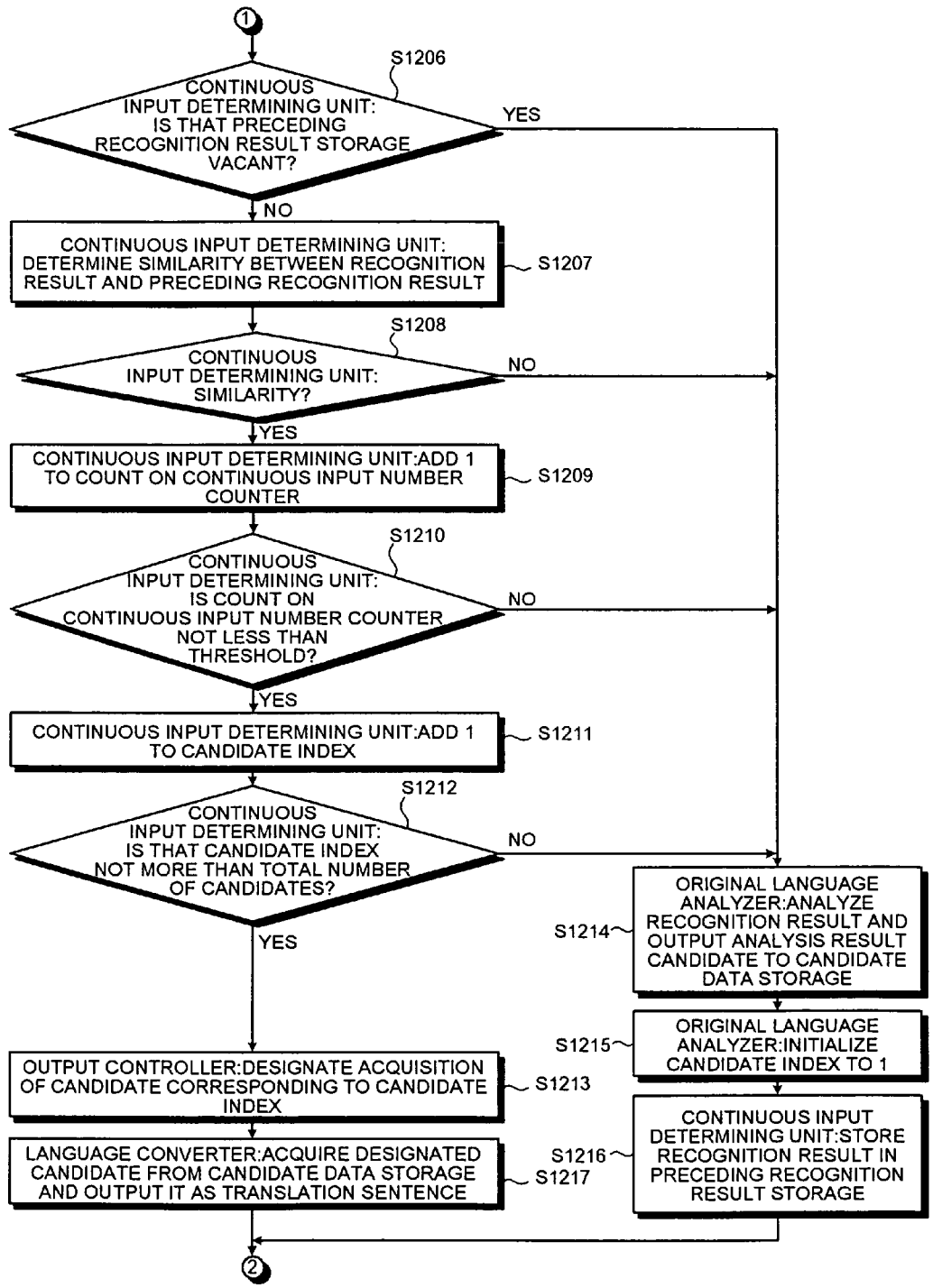

Next, the communication support process executed by the communication support apparatus 900 according to the second embodiment having the aforementioned configuration is explained. FIGS. 12A and 12B show a flowchart of the general flow of the communication support process according to the second embodiment.

The input process and the continuous input determining process of steps S1201 to S1212 are similar to the process of steps S501 to S512 in the communication support apparatus 100 according to the first embodiment and therefore are not described any more.

According to the first embodiment, the language converter 103 outputs the translation candidate sentence corresponding to the recognition result to the candidate data storage 110 at step S514. The second embodiment is different from the first embodiment, however, in that according to the second embodiment, the source language analyzer 905 analyzes the recognition result and outputs the resulting analysis result candidate to the candidate data storage 910 (step S1214).

After that, the source language analyzer 905 initializes the candidate index to 1 (step S1215), and the continuous input determining unit 102 stores the recognition result in the preceding recognition result storage 111 (step S1216).

Next, the output controller 904 designates the acquisition of the candidate corresponding to the candidate index from the candidate data storage 910 (step S1213). Specifically, at the time of first input, the candidate index is set to 1 (step S1215) after execution of the analysis process (step S1214). Among the analysis result candidates, therefore, the acquisition of the first candidate with the candidate index 1 is designated.

When similar speechs are continuously input, the fact that the candidate index is set to a value plus one (1) (step S1211) leads to the designation of acquisition of the candidate corresponding to the next candidate index from the analysis result candidates stored in the preceding process without repeatedly executing the analysis process at step S1214.

Next, the language converter 903 acquires the candidate designated by the output controller 904 from the candidate data storage 910, and translating it into the target language sentence having the same meaning as the acquired analysis result candidate, outputs the translation result as a translation sentence (step S1217).

Next, a specific example of the communication support process executed in accordance with the aforementioned steps is explained. In this case, for simplification of explanation, assume that the threshold value of the continuous input number counter is set to two (2).

Consider a case in which the user inputs the source language sentence "KEKKO" as a wording meaning "I do not want it." (step S1204). In this case, the source language analyzer 905 outputs the morphological analysis result candidate shown in FIG. 10f (step S1214), so that "OK DESU" constituting the analysis result candidate corresponding to the candidate index 1 is selected for the first input (step S1213), and the corresponding translation sentence is output (step S1217).

Assume, however, that the intention of the user is not correctly transmitted and therefore the user inputs the source language sentence "KEKKO DESU" again. The continuous input determining unit 102 determines that a similar source language sentence has been input (step S1208), and 1 is added to the count on the continuous input number counter (step S1209). Also, since the count on the continuous input number counter reaches the same value as the threshold value two (2) (YES at step S1210), one (1) is added also to the candidate index (step S1211), and the output controller 904 designates the acquisition of the candidate of the candidate index 2 (step S1213). As a result, the language converter 903 acquires the analysis result candidate "IRI MASEN" corresponding to the candidate index 2 in FIG. 10F, and thus can output the correct translation sentence (step S1217).

As described above, with the communication support apparatus 900 according to the second embodiment, assume that a plurality of the source language analysis results exist and similar speech recognition results are produced continuously. An analysis result different from the first selected analysis result is selected for the subsequently recognized source language sentence, and a corresponding translation sentence can be output. As a result, in the case where a translation error occurs and the user inputs a similar source language sentence again, the same translation error is avoided, so that the burden of the input operation on the user is alleviated and the proper translation sentence can be output.

Also, in the case where similar speechs are input, a candidate different from the preceding analysis result candidate is selected and the translation process executed without repeating the process of analyzing the source language. Thus, the number of times the analysis process of a heavy processing load is executed can be reduced.

With the communication support apparatus according to a third embodiment, the meaning of a source language sentence is analyzed, and after being translated into a corresponding target language and output as a translation sentence. In the process, assume that in the presence of a plurality of candidates for translation word candidates and the occurrence of a translation error due to the improper candidate selection, the user inputs a similar source language sentence continuously. Then, a candidate different from the first selected candidate is selected for the subsequently input source language sentence and a corresponding translation sentence is output.

The communication support apparatus according to the third embodiment can be used for machine translation of transfer type, in which like in the second embodiment, the source language sentence is analyzed, the analysis result is converted and a translation sentence is generated from the conversion result. Although the second embodiment is such that a plurality of candidates output by the process of analyzing the source language sentence are subjected to the selective control process, a plurality of candidates output by the analysis result conversion process are subjected to the selective control operation according to the third embodiment.

Figures 13, 14:
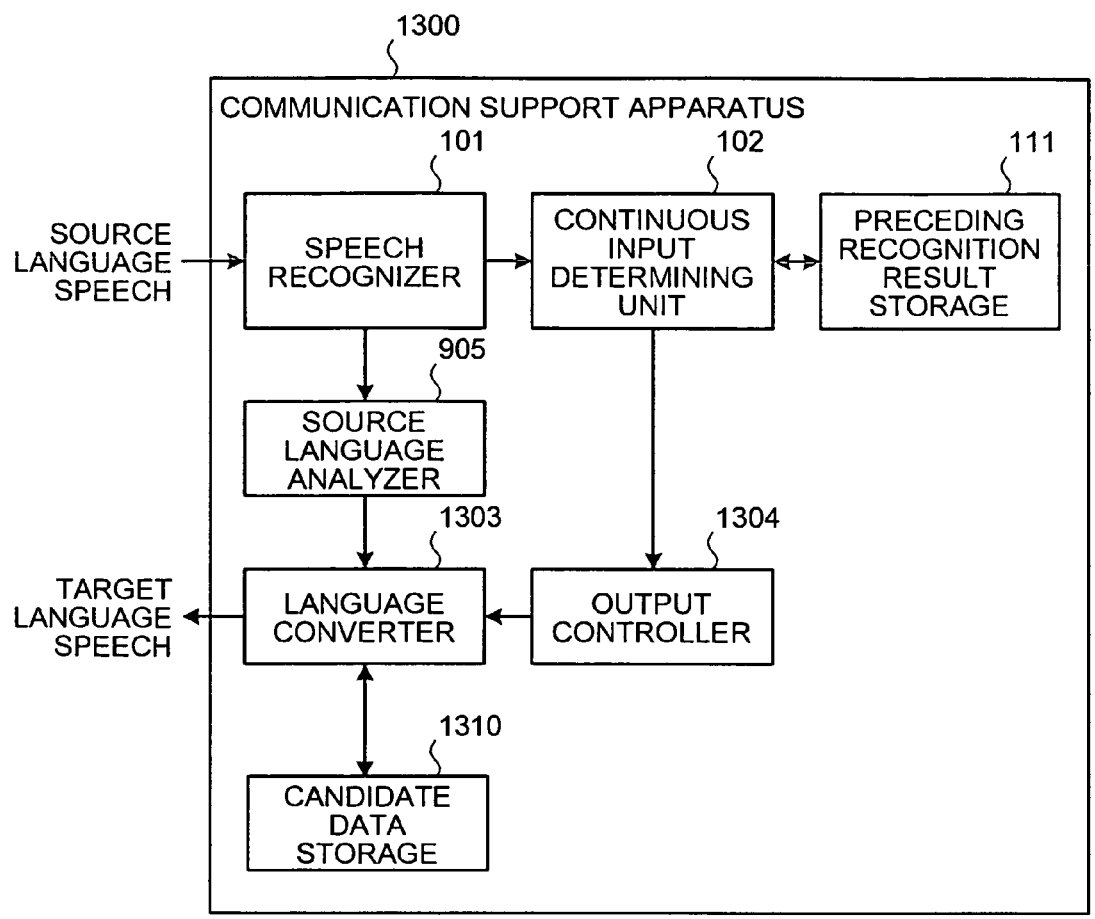
FIG. 13 is a block diagram showing a configuration of a communication support apparatus according to a third embodiment.
FIG. 14 shows an example of the data structure of a candidate data storage unit.

FIG. 13 is a block diagram showing a configuration of the communication support apparatus 1300 according to the third embodiment. As shown in FIG. 13, the communication support apparatus 1300 includes a speech recognizer 101, a continuous input determining unit 102, a language converter 1303, an output controller 1304, a source language analyzer 905, a candidate data storage 1310 and a preceding recognition result storage 111.

According to the third embodiment, the functions of the language converter 1303 and the output controller 1304 and the data structure of the candidate data storage 1310 are different from those of the second embodiment. The other parts and functions of the configuration remain similar to those of the configuration of the communication support apparatus 900 according to the second embodiment shown in the block diagram of FIG. 9, and therefore, being designated by the same reference numerals, not described any further.

In the language converter 1303, the analysis result output from the source language analyzer 905 is translated into a target language having the same meaning as the analysis result, and a translation word candidate constituting at least one translation result is output, and one of the output translation word candidates is selected to generate and output a translation sentence. In the process, the language converter 1303 selects a translation word candidate corresponding to the candidate index designated by the output controller 1304 described later.

When the continuous input determining unit 102 determines that a similar source language sentence is continuously input, the output controller 1304 controls the process executed by the language converter for selecting the translation word candidates in such a manner that a translation word candidate different from the one selected earlier is selected by the language converter 1303 for the subsequently input source language sentence. When only one translation word candidate exists corresponding to the input source language sentence, the control process for switching the selected translation word candidate is not executed.

The candidate data storage 1310 stores the analysis result in the source language and at least one corresponding translation word candidate resulting from the translation of the analysis result by the language converter 1303. FIG. 14 is a diagram showing an example of the data structure of the candidate data storage 1310.

As shown in FIG. 14, the candidate data storage 1310 stores, in correspondence with each other, the analysis result output from the source language analyzer 905, the number of candidates representing the number of the translation word candidates resulting from the translation of the source language by the language converter 1303 and a translation word candidate list containing one or a plurality of translation word candidates. FIG. 14 shows a case in which the source language of translation is English and the target language of translation is Japanese in the presence of a plurality of translation word candidates in Japanese having the same meaning as the English counterpart.

Figure 15A:
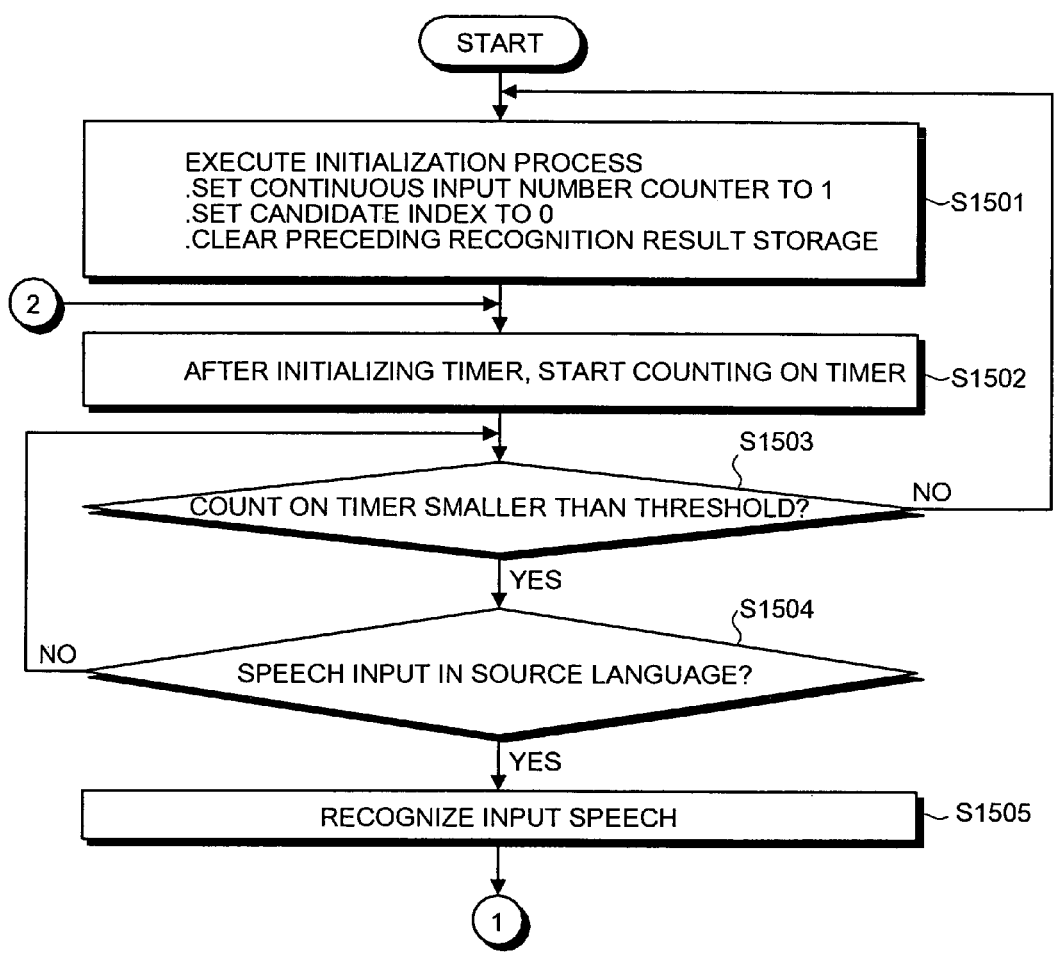

Next, the communication support process executed by the communication support apparatus 1300 according to the third embodiment having the aforementioned configuration is explained. FIGS. 15A and 15B show a flowchart of the general flow of the communication support process according to the third embodiment.

The input process and the continuous input determining process of steps S1501 to S1512 are similar to the process of steps S1201 to S1212 in the communication support apparatus 900 according to the second embodiment and therefore not explained any more.

According to the second embodiment, at step S1214, the source language analyzer 905 analyzes the recognition result and outputs the resulting analysis result candidates to the candidate data storage 110. According to the third embodiment, however, unlike in the second embodiment, the source language analyzer 905 analyzes the recognition result (step S1514), the language converter 1303 translates the analysis result, and the resulting translation word candidate constituting the translation result is output to the candidate data storage 1310 (step S1515).

After that, the language converter 1303 initializes the candidate index to one (1) (step S1516), and the continuous input determining unit 102 stores the recognition result in the preceding recognition result storage 111 (step S1517).

Next, the output controller 1304 designates the acquisition of a candidate corresponding to the candidate index from the candidate data storage 1310 (step S1513). Specifically, at the time of the first input, the fact that the candidate index is set to one (1) (step S1516) after execution of the translation process (step S1515) leads to the designation of acquisition of the first candidate having the candidate index 1 among the analysis result candidates.

When similar speechs are continuously input, the fact that the candidate index is set to a value plus one (1) (step S1511) leads to the designation of acquisition of a candidate corresponding to the candidate index from the translation word candidates stored by the preceding process without repeating the analysis process and the translation process at steps S1514 and S1515.

Next, the language converter 1303 acquires a candidate designated by the output controller 1304 from the candidate data storage 1310, and generates and outputs a translation sentence using the acquired translation word candidate (step S1518).

As described above, in the communication support apparatus 1300 according to the third embodiment, assume that a plurality of translation word candidates exist at the time of translation and similar speech recognition results are produced continuously. A translation word candidate different from the first selected one is selected for the subsequently recognized source language sentence, and a translation sentence can be generated from the selected translation word candidate. Even in the case where the user repeatedly inputs a similar source language sentence due to a translation error, therefore, the repetition of the same translation error is avoided. Thus, the user burden for repeated input operation is alleviated and the proper translation sentence can be output. Also, in the case where similar speechs are input, the translation process can be executed by selecting a candidate different from the one resulting from the preceding conversion process without executing any analysis or conversion process of the source language again, and therefore the number of times the analysis and conversion processes having a heavy processing load is executed can be reduced.

In the communication support apparatus according to a fourth embodiment, the translation direction indicating the combination of the source language constituting a translation source and a target language of translation is properly selected in accordance with the prevailing situation to execute the translation process. In the process, assume that a plurality of translation directions exist and an improper selection of the translation direction causes a translation error so that the user continuously inputs a similar source language sentence. A translation direction different from the first selected one is selected for the subsequently input source language sentence, and a corresponding translation sentence is output. The "translation direction" is defined as a combination of the source language providing a translation source and the target language of translation.

Also in the fourth embodiment, like in the second or third embodiment, an explanation is based on the machine translation of transfer type. Nevertheless, the machine translation of direct conversion type as in the first embodiment can be employed with equal effect.

FIG. 16 is a block diagram showing a configuration of the communication support apparatus 1600 according to a fourth embodiment. As shown in FIG. 16, the communication support apparatus 1600 includes a speech recognizer 101, a continuous input determining unit 102, a language converter 1603, an output controller 1604, a translation direction data storage 1610 and a preceding recognition result storage 111.

The fourth embodiment is different from the second embodiment in that the fourth embodiment further includes the translation direction data storage 1610 in addition to the functions of the language converter 1603 and the output controller 1604. The other parts of the configuration and the functions are similar to those of the configuration of the communication support apparatus 900 according to the second embodiment shown in the block diagram of FIG. 9. The same or similar component parts, therefore, are designated by the same reference numerals, respectively, and will not be described any more.

The translation direction data storage 1610 stores the translation direction that can be used in the communication support apparatus 1600. FIG. 17 shows an example of the data structure of the translation direction data storage 1610.

As shown in FIG. 17, the translation direction storage 1610 stores the candidate index for identifying the translation direction uniquely and a corresponding translation direction. FIG. 17 shows six translation directions stored as combinations of Japanese, English and Chinese appropriately as a source language and a target language. The translation direction and the order of storage thereof can be changed in accordance with the situation prevailing at the time when the apparatus is in operation.

In the language converter 1603, the analysis result output from the source language analyzer 905 is translated to a target language sentence having the same meaning as the particular analysis result, and from the resulting translation words, a translation sentence is generated and output. In the process, the language converter 1603 selects the translation direction corresponding to the candidate index designated by the output controller 1604 described later, and the translation sentence is generated in accordance with the translation direction thus selected.

The output controller 1604, upon determination by the continuous input determining unit 102 that the similar source language sentence is continuously input, controls the translation direction select operation of the language converter 1603 in such a manner that a translation direction different from the previously selected direction is selected by the language converter 1603 for the subsequently input source language sentence.

Figure 18A:
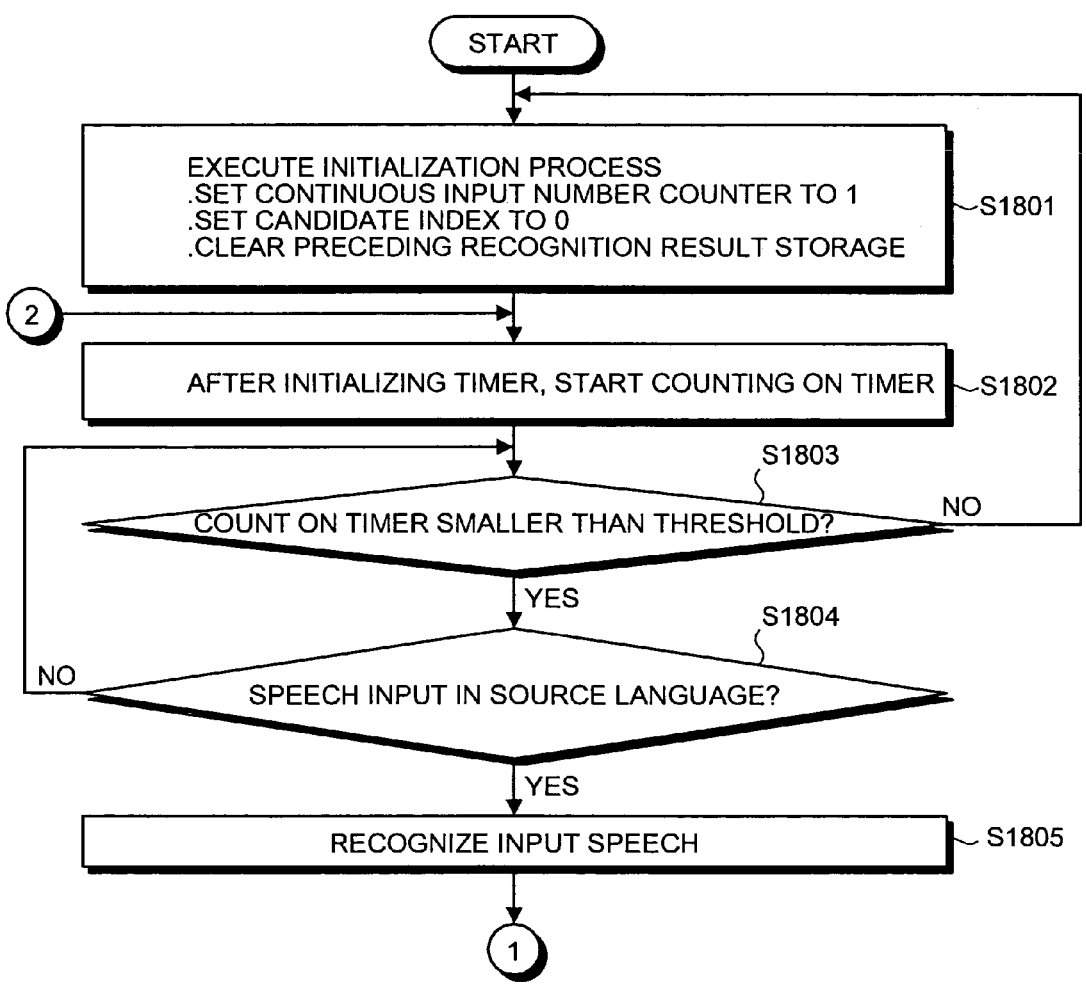

Now, the communication support process executed by the communication support apparatus 1600 according to the fourth embodiment having the aforementioned configuration is explained. FIGS. 18A and 18B show a flowchart of the general flow of the communication support process according to the fourth embodiment.

The input process and the continuous input determining process of steps S1801 to S1812 are similar to the process of steps S1201 to S1212 executed by the communication support apparatus 900 according to the second embodiment, and therefore are not described again.

According to the second embodiment, the analysis process is executed by the source language analyzer 905 at step S1214. Nevertheless, the fourth embodiment is different from the second embodiment in that in the fourth embodiment, the analysis process is not executed but the candidate index initialization process (step S1814) and the recognition result storage process (step S1815).

Next, the source language analyzer 905 analyzes the recognition result and outputs the analysis result (step S1813). Then, the output controller 1604 designates the selection of the translation direction corresponding to the candidate index from the translation direction data storage 1610 (step S1816).

At the time of first input, for example, the selection of the translation direction with the candidate index 1 designated at step S1814 is designated. Also, in the case where similar speechs are continuously input, a value of the candidate index plus one (1) is set (step S1811), and therefore the selection of the translation direction corresponding to the particular candidate index is designated.

Next, in the language converter 1603, the translation direction designated by the output controller 1604 is selected from the translation direction data storage 1610 (step S1817), and in accordance with the selected translation direction, the analysis result output from the source language analyzer 905 is converted, so that a translation sentence is generated and output (step S1818).

A specific example of the communication support process executed according to the steps described above is explained. Assume, for example, that the user inputs a speech in Japanese (step S1804) and a translation sentence in English is output (step S1818) and that since the other party of speech understands Chinese but not English, the communicative intention of the user is not transmitted successfully. In the process, the user inputs the same speech again (step S1804). Then, the "Japanese to Chinese" translation is selected as the next candidate for translation direction (step S1817). Thus, the translation sentence in Chinese is output appropriately (step S1818).

As described above, in the case where a plurality of translation directions exist and similar speech recognition results are continuously produced, the communication support apparatus 1600 according to the fourth embodiment operates in such a manner that a translation direction different from the first selected translation direction is selected for the subsequently recognized source language sentence, and in accordance with the selected translation direction, the translation is carried out and a translation sentence is output. Even in the case where a translation error causes the user to input a similar source language sentence again, therefore, the repetition of the same translation error is avoided so that the burden on the user for repeated input operation is alleviated and a proper translation sentence can be output.

In a communication support apparatus according to a fifth embodiment, an appropriate one of a plurality of phonation types is selected and the translation sentence is aurally synthesized and output according to the selected phonation type. In the process, assume that the phonation type is improper and the intention of the user fails to be transmitted to the other party so that the user inputs a similar source language sentence continuously. A phonation type different from the first selected one is selected for the subsequently input source language sentence, and a corresponding translation sentence is aurally synthesized and output.

Figure 19:
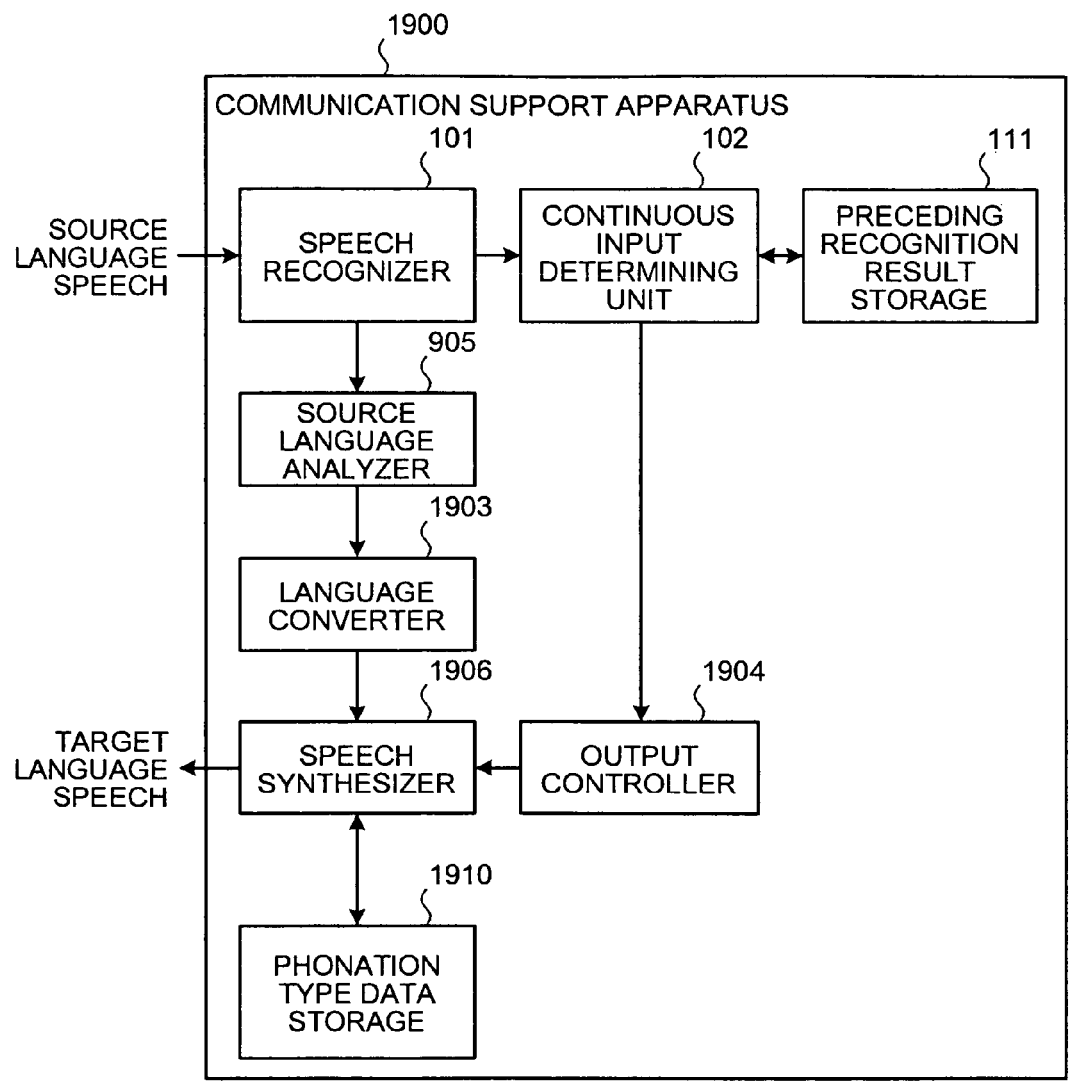
FIG. 19 is a block diagram showing a configuration of a communication support apparatus according to a fifth embodiment.

FIG. 19 is a block diagram showing a configuration of the communication support apparatus 1900 according to a fifth embodiment. As shown in FIG. 19, the communication support apparatus 1900 includes a speech recognizer 101, a continuous input determining unit 102, a language converter 1903, an output controller 1904, a source language analyzer 905, a speech synthesizer 1906, a phonation type data storage 1910 and a preceding recognition result storage 111.

The fifth embodiment is different from the second embodiment in that in the fifth embodiment, the speech synthesizer 1906 and the phonation type data storage 1910 are added and the functions of the language converter 1903 and the output controller 1904 are different from those of the second embodiment. The other parts of the configuration and functions are similar to those of the configuration of the communication support apparatus 900 according to the second embodiment shown in the block diagram of FIG. 9. Therefore, they are designated by the same reference numerals, respectively, and not described again.

The phonation type data storage 1910 stores the phonation type usable for the speech synthesis process executed by the communication support apparatus 1900. FIG. 20 shows an example of the data structure of the phonation type data storage 1910.

As shown in FIG. 20, the phonation type data storage 1910 stores the candidate index for identifying the phonation type uniquely and a corresponding phonation type. The phonation type can be designated in various combinations of elements such as the volume, utterance rate, voice pitch, intonation and accent. These elements are illustrative, and any elements which change the method of utterance of the synthesized speech can be used.

In the language converter 1903, the analysis result output from the source language analyzer 905 is translated into a target language sentence having the same meaning as the analysis result, and a translation sentence is generated and output from the translation words.

The speech synthesizer 1906 receives the translation sentence output from the language converter 1903 and outputs the contents thereof as a synthesized speech in the target language. In the process, the speech synthesizer 1906 selects the phonation type corresponding to the candidate index designated by the output controller 1904 described later, and executes the speech synthesis process for a translation sentence in accordance with the phonation type selected.

The speech synthesis process executed by the speech synthesizer 1906 can use any of generally-used various methods including the text-to-speech system using the phoneme edition speech synthesis or the Formant speech synthesis.

The output controller 1904, upon determination by the continuous input determining unit 102 that a similar source language sentence is continuously input, controls the phonation type selecting process of the speech synthesizer 1906 in such a manner that a phonation type different from the one selected earlier by the speech synthesizer 1906 is selected for the subsequently input source language sentence.

Figure 21A:
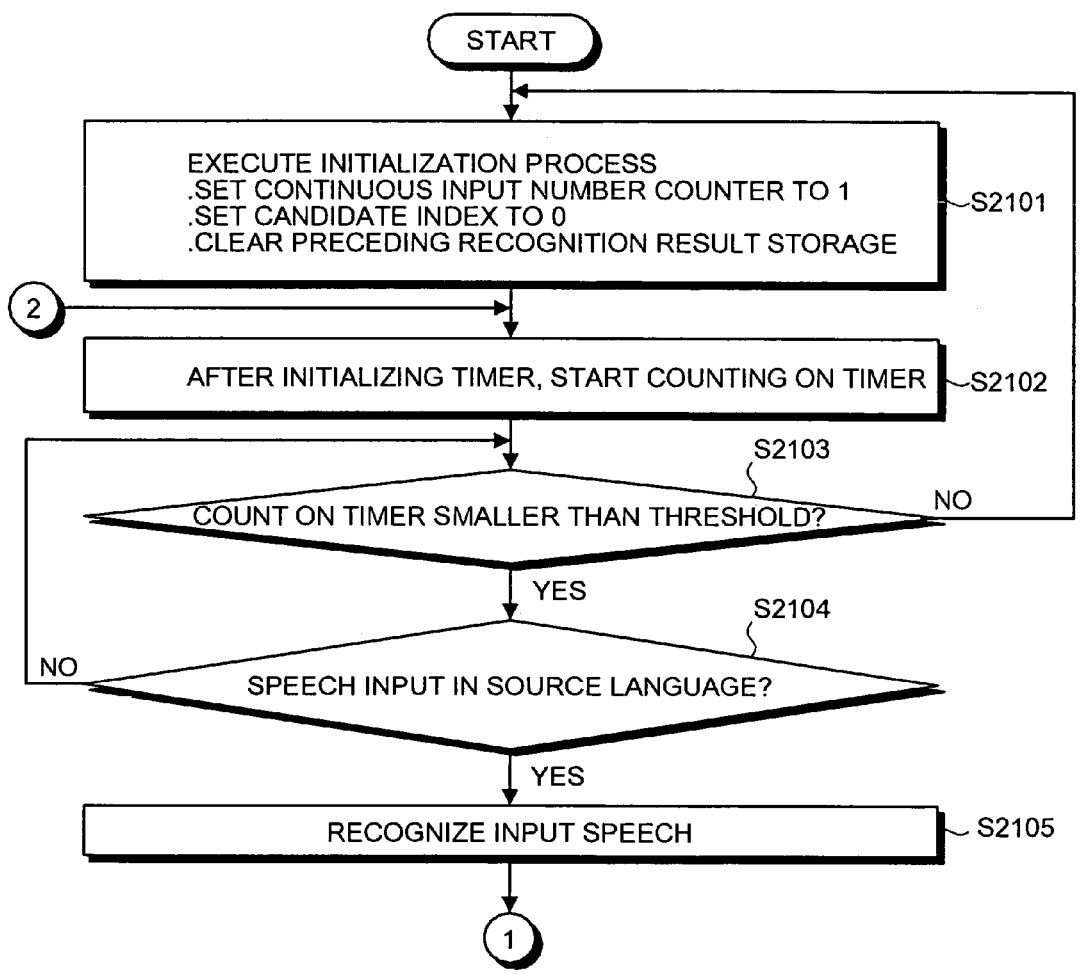
FIGS. 21A and 21B show a flowchart of a general flow of the communication support process according to the fifth embodiment.
Figure 21B:
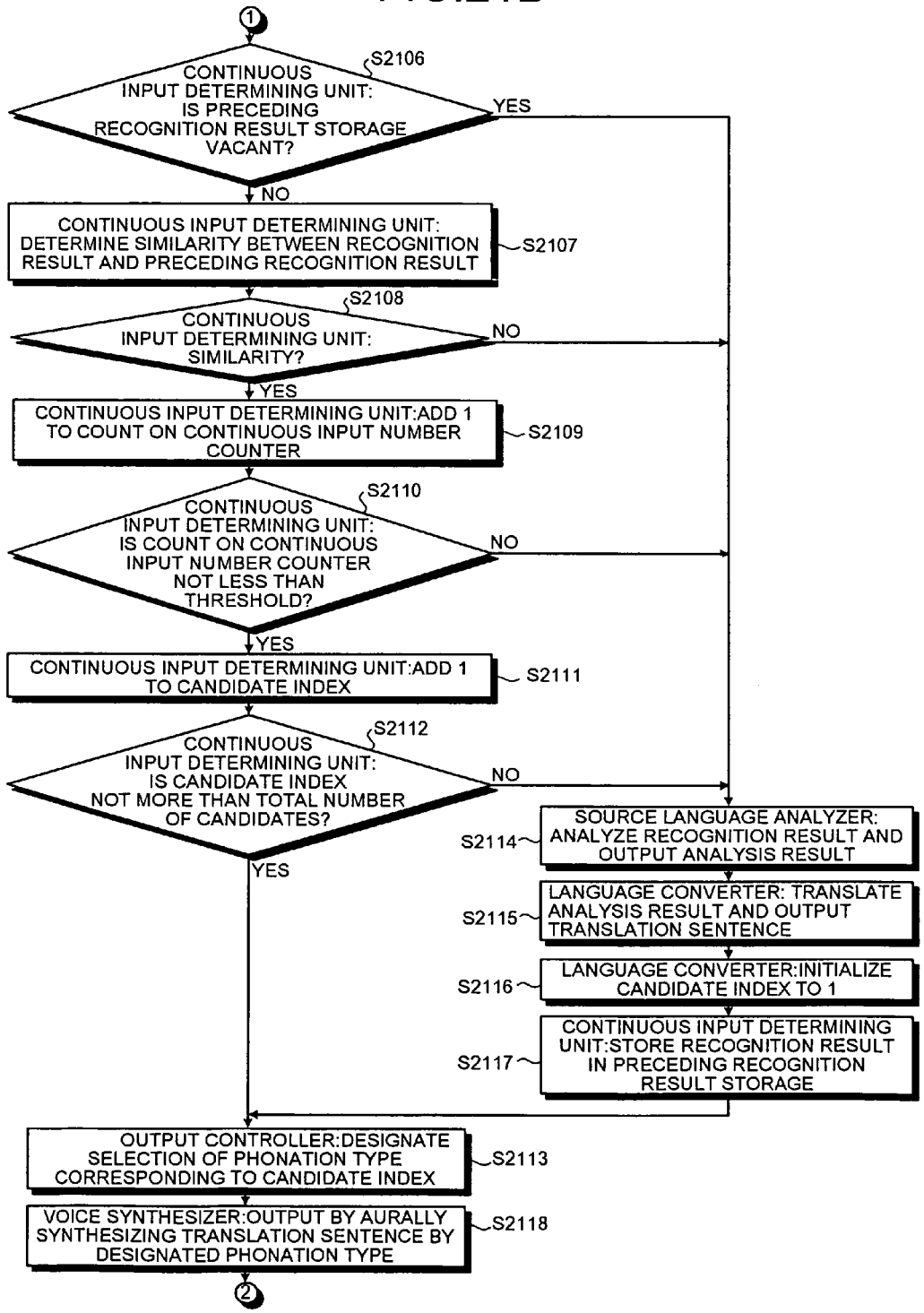

Next, the communication support process executed by the communication support apparatus 1900 according to a fifth embodiment having the aforementioned configuration is explained. FIGS. 21A, 21B are flowcharts showing the general flow of the communication support process according to the fifth embodiment.

The input process and the continuous input determining process of steps S2101 to S2112 are similar to the process of steps S1201 to S1212 for the communication support apparatus 900 according to the second embodiment, and therefore are not described again.

When the continuous input determining unit 102 determines that the candidate index exceeds the total number of candidates (NO at step S2112), the source language analyzer 905 analyzes the recognition result and outputs the analysis result (step S2114). Next, the language converter 1903 translates the analysis result output by the source language analyzer 905 and outputs a translation sentence (step S2115), after which the candidate index is initialized to one (1) (step S2116). Also, the continuous input determining unit 102 stores the recognition result in the preceding recognition result storage 111 (step S2117).

Next, the output controller 1904 instructs the phonation type corresponding to the candidate index to be selected from the phonation type data storage 1910 (step S2113).

At the time of first input, for example, the selection of the first phonation type with the candidate index 1 designated at step S2116 is designated. Also, in the case where similar speechs are continuously input, the fact that a value of the candidate index plus 1 is set (step S2111) leads to the designation of the selection of the phonation type corresponding to the particular candidate index.

Next, the language converter 1903 selects the phonation type designated by the output controller 1904 from the phonation type data storage 1910, and executing the speech synthesis process for the translation sentence output at step S2115 in accordance with the selected phonation type, outputs the result thereof (step S2118).

As described above, with the communication support apparatus 1900 according to the fifth embodiment, assume that a plurality of phonation types exists at the time of speech synthesis and a similar speech recognition result is produced continuously. A phonation type different from the first selected phonation type is selected for the subsequently recognized source language sentence, and by the speech synthesis in accordance with the selected phonation type, the speech of the translation sentence can be output. Even in the case where an improper speech synthesis process makes it impossible to transmit the communicative intention of the user to the other party and the user tries to input a similar source language sentence again, therefore, the repetition of the improper speech synthesis process is prevented and the burden on the user to input the source language sentence again is reduced, thereby making it possible to output a proper translation sentence.

Although the first to fifth embodiments are explained above with reference to a configuration using the speech recognition as a recognition process, the recognition process is not limited to the speech recognition, but may include the character recognition, the handwritten input recognition or the image recognition. Also, the learning function may be added so that the input which has been correctly translated a number of times in the past may not be subjected to the continuous input determining process or the output control process described above.

The communication support program executed by the communication support apparatus according to the first to fifth embodiments is provided in the form built in a read-only memory (ROM) or the like.

The communication support program executed by the communication support apparatus according to the first to fifth embodiments may alternatively be provided in the form of a computer readable recording medium such as a CD-ROM (compact disk read-only memory), a flexible disk (FD), a compact disk recordable (CD-R) or a digital versatile disk (DVD) with an installable or executable file.

Further, the communication support program executed by the communication support apparatus according to the first to fifth embodiments may be so configured as to be stored on a computer connected to a network such as the Internet and downloaded through the network. Also, the communication support program executed by the communication support apparatus according to the first to fifth embodiments can be provided or distributed through the network such as the Internet.

The communication support program executed by the communication support apparatus according to the first to fifth embodiments has a modular configuration including the aforementioned parts (the speech recognizer, continuous input determining unit, language converter, output controller, source language analyzer and the speech synthesizer). As an actual hardware, a central processing unit (CPU) executes by reading the communication support program from a ROM, so that the parts described above are loaded and generated on the main storage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication support apparatus comprising:
a processing system comprising at least one processor; and
a memory comprising one or more tangible computer-readable media containing instructions for execution by the processing system, wherein the instructions, when executed by the processing system, programmatically define:
  a speech recognizer that recognizes a first speech of a source language as a first source language sentence, and recognizes a second speech of the source language following the first speech as a second source language sentence;
  a determining unit that determines whether the second source language sentence is similar to the first source language sentence; and
  a language converter that translates the first source language sentence into a first translation sentence, and translates the second source language sentence into a second translation sentence different from the first translation sentence when the determining unit determines that the second language sentence is similar to the first source language sentence.

2. The communication support apparatus according to claim 1, further comprising a translation data storage that stores a source language sentence and at least one translation candidate sentence which is a target language sentence having the same meaning as the source language sentence, the source language sentence and the translation candidate sentence being associated with each other,
wherein when the determining unit determines that the second source language sentence is similar to the first source language sentence, the language converter searches the translation data storage for at least one translation candidate sentence with the first source language sentence and the second source language sentence being each a search key, selects a first translation candidate sentence from the at least one translation candidate sentence as the first translation sentence, and selects a second translation candidate sentence different from the first translation candidate sentence from the at least one translation candidate sentence as the second translation sentence.

3. The communication support apparatus according to claim 1, wherein the instructions further programmatically define:
a source language analyzer that analyzes a meaning of the first source language sentence to output at least one first analysis result candidate, and analyzes a meaning of the second source language sentence to output at least one second analysis result candidate,
wherein when the determining unit determines that the second source language sentence is similar to the first source language sentence, the language converter selects one of the at least one first analysis result candidate, selects one of the at least second analysis result candidate different from the one of the at least one first analysis result candidate, translates the first source language sentence into the first translation sentence based on the first analysis result candidate selected, and translates the second source language sentence into the second translation sentence based on the second analysis result candidate selected.

4. The communication support apparatus according to claim 3,
wherein the source language analyzer morphologically analyzes the first source language sentence to output at least one first morphological analysis result candidate as the at least one first analysis result candidate, and analyzes the second source language sentence to output at least one second morphological analysis result candidate as the at least one second analysis result candidate,
when the determining unit determines that the second source language sentence is similar to the first source language sentence, the language converter selects one of the at least one first morphological analysis result candidate, selects one of the at least second morphological analysis result candidate different from the one of the at least one first morphological analysis result candidate, translates the first source language sentence into the first translation sentence based on the first morphological analysis result candidate selected, and translates the second source language sentence into the second translation sentence based on the second morphological analysis result candidate selected.

5. The communication support apparatus according to claim 3,
wherein the source language analyzer parses the first source language sentence to output at least one first parsing analysis result candidate as the at least one first analysis result candidate, and analyzes the second source language sentence to output at least one second parsing analysis result candidate as the at least one second analysis result candidate,
when the determining unit determines that the second source language sentence is similar to the first source language sentence, the language converter selects one of the at least one first parsing analysis result candidate, selects one of the at least second parsing analysis result candidate different from the one of the at least one first parsing analysis result candidate, translates the first source language sentence into the first translation sentence based on the first parsing analysis result candidate selected, and translates the second source language sentence into the second translation sentence based on the second parsing analysis result candidate selected.

6. The communication support apparatus according to claim 3,
wherein the source language analyzer subjects the first source language sentence to a modification analysis to output at least one first modification analysis result candidate as the at least one first analysis result candidate, and subjects the second source language sentence to the modification analysis to output at least one second modification analysis result candidate as the at least one second analysis result candidate,
when the determining unit determines that the second source language sentence is similar to the first source language sentence, the language converter selects one of the at least one first modification analysis result candidate, selects one of the at least second modification analysis result candidate different from the one of the at least one first modification analysis result candidate, translates the first source language sentence into the first translation sentence based on the first modification analysis result candidate selected, and translates the second source language sentence into the second translation sentence based on the second modification analysis result candidate selected.

7. The communication support apparatus according to claim 3,
wherein the source language analyzer anaphorically analyzes the first source language sentence to output at least one first anaphorical analysis result candidate as the at least one first analysis result candidate, and anaphorically analyzes the second source language sentence to output at least one second anaphorical analysis result candidate as the at least one second analysis result candidate,
when the determining unit determines that the second source language sentence is similar to the first source language sentence, the language converter selects one of the at least one first anaphorical analysis result candidate, selects one of the at least second anaphorical analysis result candidate different from the one of the at least one first anaphorical analysis result candidate, translates the first source language sentence into the first translation sentence based on the first anaphorical analysis result candidate selected, and translates the second source language sentence into the second translation sentence based on the second anaphorical analysis result candidate selected.

8. The communication support apparatus according to claim 3,
wherein the source language analyzer analyzes an ellipsis resolution of the first source language sentence to output at least one first ellipsis analysis result candidate as the at least one first analysis result candidate, and analyzes an ellipsis resolution of the second source language sentence to output at least one second ellipsis analysis result candidate as the at least one second analysis result candidate,
when the determining unit determines that the second source language sentence is similar to the first source language sentence, the language converter selects one of the at least one first ellipsis analysis result candidate, selects one of the at least second ellipsis analysis result candidate different from the one of the at least one first ellipsis analysis result candidate, translates the first source language sentence into the first translation sentence based on the first ellipsis analysis result candidate selected, and translates the second source language sentence into the second translation sentence based on the second ellipsis analysis result candidate selected.

9. The communication support apparatus according to claim 3,
wherein the source language analyzer analyzes a communicative intention of the first source language sentence to output at least one first communicative intention analysis result candidate as the at least one first analysis result candidate, and analyzes a communicative intention of the second source language sentence to output at least one second communicative intention analysis result candidate as the at least one second analysis result candidate,
when the determining unit determines that the second source language sentence is similar to the first source language sentence, the language converter selects one of the at least one first communicative intention analysis result candidate, selects one of the at least second communicative intention analysis result candidate different from the one of the at least one first communicative intention analysis result candidate, translates the first source language sentence into the first translation sentence based on the first communicative intention analysis result candidate selected, and translates the second source language sentence into the second translation sentence based on the second communicative intention analysis result candidate selected.

10. The communication support apparatus according to claim 1, wherein the instructions further programmatically define:
a source language analyzer that analyzes a meaning of the first source language to output at least one first analysis result, and analyzes a meaning of the second source language to output at least one second analysis result,
wherein when the determining unit determines that the second source language sentence is similar to the first source language sentence, the language converter outputs at least one first translation word candidate indicating the same meaning as the first source language sentence based on the first analysis result, outputs at least one second translation word candidate indicating the same meaning as the second source language sentence based on the second analysis result, selects one of the at least first translation word candidate, selects one of the at least second translation word candidate different from the one of the at least one first translation word candidate, translates the first source language sentence into the first translation sentence based on the first translation word candidate selected, and translates the second source language sentence into the second translation sentence based on the second translation word candidate selected.

11. The communication support apparatus according to claim 1,
wherein when the determining unit determines that the second source language sentence is similar to the first source language sentence, the language converter selects a first translation direction of the first source language sentence, selects a second translation direction of the second source language sentence different from the first translation direction, translates the first source language sentence into the first translation sentence based on the first translation direction, and translates the second source language sentence into the second translation sentence based on the second translation direction.

12. A communication support apparatus comprising:
a processing system comprising at least one processor; and
a memory comprising one or more tangible computer-readable media containing instructions for execution by the processing system, wherein the instructions, when executed by the processing system, programmatically define:
  a speech recognizer that recognizes a first speech of a source language as a first source language sentence, and recognizes a second speech of the source language following the first speech as a second source language sentence;
  a determining unit that determines whether the second source language sentence is similar to the first source language sentence;
  a language converter that translates the first source language sentence into a first translation sentence, and translates the second source language sentence into a second translation sentence; and
  a speech synthesizer that synthesizes the first translation sentence into a third speech in accordance with a first phonation type, and synthesizes the second translation sentence into a fourth speech in accordance with a second phonation type different from the first phonation type when the determining unit determines that the second source language sentence is similar to the first source language sentence.

13. A communication support method comprising:
recognizing a first speech of a source language as a first source language sentence;
translating the first source language sentence into a first translation sentence;
recognizing a second speech of the source language following the first speech as a second source language sentence;
determining whether the second source language sentence is similar to the first source language sentence; and
translating the second source language sentence into a second translation sentence different from the first translation sentence when it is determined that the second source language sentence is similar to the first source language sentence.

14. A communication support method comprising:
recognizing a first speech of a source language as a first source language sentence;
translating the first source language sentence into a first translation sentence;
recognizing a second speech of the source language following the first speech as a second source language sentence;
determining whether the second source language sentence is similar to the first source language sentence;
translating the second source language sentence into a second translation sentence; and
synthesizing the first translation sentence into a third speech in accordance with a first phonation type, and synthesizing the second translation sentence into a fourth speech in accordance with a second phonation type different from the first phonation type when it is determined that the second source language sentence is similar to the first source language sentence.

15. A computer program product having a non-transitory computer readable medium including programmed instructions for supporting a communication, wherein the instructions, when executed by a computer, cause the computer to perform:
recognizing a first speech of a source language as a first source language sentence;
translating the first source language sentence into a first translation sentence; and
recognizing a second speech of the source language following the first speech as a second source language sentence;
determining whether the second source language sentence is similar to the first source language sentence;
translating the second source language sentence into a second translation sentence different from the first translation sentence when it is determined that the second source language sentence is similar to the first source language sentence.

16. A computer program product having a non-transitory computer readable medium including programmed instructions for supporting a communication, wherein the instructions, when executed by a computer, cause the computer to perform:
recognizing a first speech of a source language as a first source language sentence;
translating the first source language sentence into a first translation sentence;
recognizing a second speech of the source language following the first speech as a second source language sentence;
determining whether the second language sentence is similar to the first language sentence;
translating the second source language sentence into a second translation sentence; and
synthesizing the first translation sentence into a third speech in accordance with a first phonation type, and synthesizing the second translation sentence into a fourth speech in accordance with a second phonation type different from the first phonation type when it is determined that the second source language sentence is similar to the first source language sentence.

* * * * *